United States Patent
Li

(10) Patent No.: US 11,851,351 B2
(45) Date of Patent: Dec. 26, 2023

(54) COMBINED FILTER UNIT AND WATER TREATMENT APPARATUS HAVING SAME

(71) Applicants: FOSHAN SHUNDE MIDEA WATER DISPENSER MANUFACTURING CO., LTD., Foshan (CN); MIDEA GROUP CO., LTD., Foshan (CN)

(72) Inventor: Yangmin Li, Foshan (CN)

(*) Notice: Subject to any disclaimer, the term of this patent is extended or adjusted under 35 U.S.C. 154(b) by 355 days.

(21) Appl. No.: 17/288,920

(22) PCT Filed: Oct. 31, 2019

(86) PCT No.: PCT/CN2019/114625
§ 371 (c)(1),
(2) Date: Apr. 27, 2021

(87) PCT Pub. No.: WO2020/088572
PCT Pub. Date: May 7, 2020

(65) Prior Publication Data
US 2021/0395114 A1    Dec. 23, 2021

(30) Foreign Application Priority Data

| Oct. 31, 2018 | (CN) | 201811289499.7 |
| Oct. 31, 2018 | (CN) | 201811291322.0 |
| Oct. 31, 2018 | (CN) | 201821790310.8 |
| Oct. 31, 2018 | (CN) | 201821791222.X |
| Oct. 31, 2018 | (CN) | 201821792306.5 |

(51) Int. Cl.
C02F 1/44       (2023.01)
B01D 61/02      (2006.01)
C02F 1/00       (2023.01)

(52) U.S. Cl.
CPC ............ C02F 1/441 (2013.01); B01D 61/025 (2013.01); C02F 1/001 (2013.01); *B01D 2311/2649* (2013.01); *C02F 2201/003* (2013.01); *C02F 2201/004* (2013.01)

(58) Field of Classification Search
CPC .... C02F 1/001; C02F 1/441; C02F 2201/003; C02F 2201/004; B01D 2311/2649; B01D 2313/44; B01D 2319/025; B01D 61/025; B01D 61/18; B01D 63/06
See application file for complete search history.

(56) References Cited

U.S. PATENT DOCUMENTS

2004/0104161 A1    6/2004   Gaignet et al.
2018/0127294 A1*   5/2018   Zhang ................. C02F 9/20

FOREIGN PATENT DOCUMENTS

| CN | 205472996 U | 8/2016 |
| CN | 207498155 U | 6/2018 |
| CN | 207877429 U | 9/2018 |
| CN | 209307002 U | 8/2019 |

(Continued)

*Primary Examiner* — Terry K Cecil
(74) *Attorney, Agent, or Firm* — KILPATRICK TOWNSEND & STOCKTON, LLP

(57) ABSTRACT

A combined filter unit and a water treatment apparatus having the same. The combined filter unit comprises a housing, a first filter assembly, an internal tube, and a second filter assembly. The first filter assembly is provided in the housing, and defines a filter material installation cavity therein. The internal tube is provided in the filter material installation cavity. The second filter assembly is provided in the internal tube.

19 Claims, 13 Drawing Sheets

(56) References Cited

FOREIGN PATENT DOCUMENTS

| CN | 209307050 U | 8/2019 |
|---|---|---|
| CN | 209307052 U | 8/2019 |
| CN | 209307055 U | 8/2019 |
| CN | 209352649 U | 9/2019 |

* cited by examiner

US 11,851,351 B2

COMBINED FILTER UNIT AND WATER TREATMENT APPARATUS HAVING SAME

CROSS-REFERENCES TO RELATED APPLICATIONS

The present disclosure is a national phase application of International Application No. PCT/CN2019/114625, filed on Oct. 31, 2019, which claims priority to Chinese Patent Application Serial Nos. 201811289499.7, 201821792306.5, 201811291322.0, 201821790310.8 and 201821791222.X, filed on Oct. 31, 2018, the entire contents of which are incorporated herein by reference.

FIELD

The present application pertains to the field of household appliances, and particularly relates to a combined filter unit and a water treatment apparatus having the same.

BACKGROUND

In the related art, a water treatment apparatus, such as a water purification dispenser, includes staged filter units, occupies a large space and has a small flux, and thus occupies a large indoor space, brings great inconvenience to a user, and is unable to meet water demands of the user.

SUMMARY

The present application seeks to solve at least one of the problems existing in the prior art.

To this end, the present application provides a combined filter unit which has a small volume and saves an occupied space.

The present application further provides a water treatment apparatus having the above-mentioned combined filter unit.

The combined filter unit according to embodiments of the present application includes: a housing; a first filter assembly provided in the housing, and defining a filter material installation cavity therein; an internal tube provided in the filter material installation cavity; and a second filter assembly provided in the internal tube.

In the combined filter unit according to the embodiments of the present application, the second filter assembly is provided in the internal tube which is provided in the first filter assembly, that is, the first filter assembly, the internal tube and the second filter assembly are nested in sequence, and a space in the first filter assembly is utilized fully, the first and second filter assemblies are spaced apart by the internal tube and combined in the housing, and two filter tubes are accommodated in an original space for one filter tube, thus saving an occupied space of the first and second filter assemblies.

In some embodiments, the internal tube is detachably provided in the filter material installation cavity.

In some embodiments, the first filter assembly is configured as an RO filter unit, and the second filter assembly is configured as a PAC filter unit having a wall thickness greater than 1 mm.

In some embodiments, the housing is provided with a first water inlet, a first water outlet, a second water inlet and a second water outlet; an outer wall of the first filter assembly and an inner wall of the housing define a first water purification cavity in communication with the second water inlet; an inner wall of the first filter assembly and an outer wall of the internal tube define a pure water cavity in communication with the second water outlet; an inner wall of the internal tube and an outer wall of the second filter assembly define a tap water cavity in communication with the first water inlet; and a second water purification cavity in communication with the first water outlet is defined in the second filter assembly.

In some embodiments, the first filter assembly includes: a central tube, the filter material installation cavity being provided in the central tube, a pure water through hole being defined on a wall of the central tube; an RO filter membrane fitted over the central tube; and an annular inner cover fitted over the central tube, an inner circumferential edge of the annular inner cover being connected with an upper end edge of the internal tube, and a lower end surface of the annular inner cover abutting against an upper end surface of the RO filter membrane.

In some embodiments, a waste water groove open downwards is defined in the annular inner cover, the upper end surface of the RO filter membrane cooperates with the annular inner cover to seal the waste water groove to form a waste water cavity, and a waste water opening in communication with the waste water cavity is defined at a top of the inner cover.

In one embodiment, a third water outlet in communication with the waste water opening is defined at a top of the housing.

In some embodiments, the second filter assembly includes: a PAC framework located in the internal tube and extending along an the axial direction of the internal tube, the second water purification cavity being defined in the PAC framework; and a PAC filter membrane fitted over the PAC framework and extending along an the axial direction of the PAC framework, the tap water cavity being defined between an outer circumferential wall of the PAC filter membrane and an inner circumferential wall of the internal tube.

In one embodiment, the PAC framework is tubular, and an inner cavity of the PAC framework is in communication with the first water outlet, and a water purification through hole is defined on a wall of the PAC framework.

Further, the second filter assembly further includes: a PAC upper end cover fitted over an upper portion of the PAC framework, a lower surface of the PAC upper end cover hermetically abutting against an upper end surface of the PAC filter membrane, and the PAC upper end cover defining thereon a first water through hole configured to communicate the tap water cavity with the first water inlet and a second water through hole configured to communicate the second water purification cavity with the first water outlet; and a PAC lower end cover fitted over a lower portion of the PAC framework, an upper surface of the PAC lower end cover hermetically abutting against a lower end surface of the PAC filter membrane.

In some embodiments, an upper flange folded downwards is formed at an outer circumferential edge of the PAC upper end cover, and an inner wall of the upper flange abuts against an outer circumferential wall of the PAC filter membrane; and a lower flange folded upwards is formed at an outer circumferential edge of the PAC lower end cover, and an inner wall of the lower flange abuts against the outer circumferential wall of the PAC filter membrane.

In some embodiments, the combined filter unit further includes a third filter assembly provided in the pure water cavity and dividing the pure water cavity into an original pure water cavity located outside the third filter assembly and a water outlet cavity located inside the third filter assembly, the water outlet cavity being in communication with the second water outlet.

In some embodiments, the third filter assembly and the internal tube are arranged along an axial direction of the first filter assembly.

In some embodiments, the combined filter unit further includes a water outlet tube running through the internal tube in the axial direction thereof, one end of the water outlet tube being in communication with the water outlet cavity, and the other end of the water outlet tube being in communication with the second water outlet.

In some embodiments, the housing includes: a cylinder, a bottom of the cylinder being open, the first filter assembly being provided in the cylinder, and the first water inlet, the first water outlet, the second water inlet and the second water outlet being defined at the top of the cylinder; and a lower cover connected with the cylinder to seal an opening of the cylinder, an upper surface of the lower cover being hermetically abutting against a lower end surface of the first filter assembly.

In some embodiments, central axes of the first and second filter assemblies as well as the internal tube coincide with a central axis of the housing.

In some embodiments, the internal tube has an open end, an outer edge of the open end of the internal tube hermetically abuts against an inner circumferential wall of the filter material installation cavity, and water pressure inside the internal tube is higher than water pressure outside the internal tube.

In some embodiments, the internal tube has an open top, and an inner diameter of an upper portion of the filter material installation cavity is kept constant or gradually reduced in a direction from top to bottom.

In some embodiments, a length of the filter material installation cavity in the axial direction of the internal tube is greater than a length of the internal tube.

In some embodiments, an outer diameter of the upper end edge of the internal tube is equal to an inner diameter of an upper end edge of the filter material installation cavity.

In some embodiments, a sealing ring is provided between an outer circumferential wall of the internal tube and an inner wall of the central tube.

In some embodiments, a sealing-ring installation groove is defined in an upper portion of the outer circumferential wall of the internal tube and extends along a circumferential direction of the internal tube.

In some embodiments, a supporting platform extending along an axial direction of the third filter assembly is provided in the filter material installation cavity, and abuts between a lower end of the internal tube and a bottom wall of the filter material installation cavity.

In some embodiments, there are supporting platforms, and the plurality of supporting platforms are provided at intervals along a circumferential direction of the third filter assembly.

In some embodiments, the combined filter unit further includes: a water outlet tube, one end of the water outlet tube being in communication with the second water outlet, and the other end of the water outlet tube extending out of the internal tube and extending into the filter material installation cavity after running through the internal tube along the axial direction of the internal tube, a PAC lower end cover being provided on an outer circumferential wall of the water outlet tube, and the second filter assembly adhering to the PAC lower end cover; and a glue blocking ring fitted over the water outlet tube, an outer circumferential edge of the glue blocking ring being provided at a circumferential outer side of the PAC lower end cover for blocking.

In some embodiments, the second filter assembly is provided around the water outlet tube, the PAC lower end cover is formed as an annular plate and connected to an end surface of the second filter assembly, and the glue blocking ring includes a connecting ring and a sealing ring, the sealing ring is formed in a cylindrical shape and fitted over outsides of the second filter assembly and the PAC lower end cover, and the connecting ring extends radially inwards from an end edge of the sealing ring away from the second filter assembly.

In some embodiments, an engaging protrusion is provided on the PAC lower end cover, and an engaging hole engaged with the engaging protrusion is defined on the glue blocking ring.

In some embodiments, the water outlet tube is configured as an integral injection molded part, and the PAC lower end cover is integrally molded on the water outlet tube by injection.

The water treatment apparatus according to embodiments of the present application includes the combined filter unit according to the above-mentioned embodiments.

The water treatment apparatus according to the embodiments of the present application has a compact structure and beneficial to reduction of an overall volume.

Embodiments of the present application will be given in part in the following descriptions, become apparent in part from the following descriptions, or be learned from the practice of the embodiments of the present application.

BRIEF DESCRIPTION OF THE DRAWINGS

The above and/or additional embodiments of the present application will become apparent and more readily appreciated from the following descriptions made with reference to the drawings, in which.

REFERENCE NUMERALS

Figure 1:
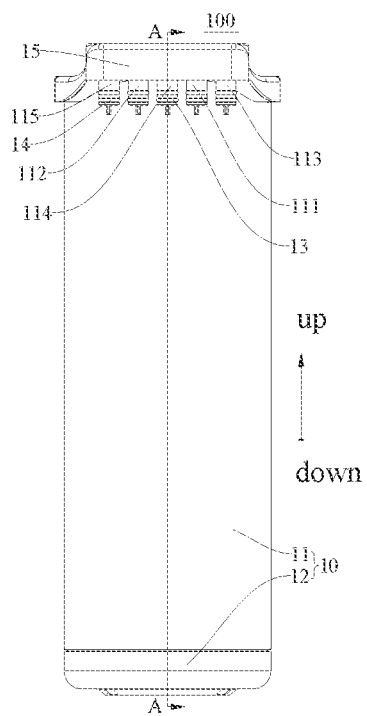
FIG. 1 is a schematic structural diagram of a combined filter unit according to embodiments of the present application.

100: combined filter unit;

10: housing; 11: cylinder; 111: first water inlet; 112: first water outlet; 113: second water inlet; 114: second water outlet; 115: third water outlet; 12: lower cover; 13: adapter; 14: waste water plug; 140: sleeve; 141: insertion section; 142: guide section; 1421: water guiding post; 143: capillary tube; 1431: flow guiding channel; 15: decorative cover; 16: handle; 161: fitting structure; 1611: first inserting structure; 16111: shaft sleeve; 16112: guide groove; 16113: engaging hole; 1612: second inserting structure; 16121: inserting post; 16122: inserting hole; 16123: engaging block; 17: fixing structure; 171: first fixing structure; 1711: guide post; 1712: limiting post; 172: second fixing structure; 1721: groove; 1722: constriction; 1724: connecting post;

20: first filter assembly; 21: central tube; 210: filter material installation cavity; 211: enclosing plate; 2111: pure water through hole; 2112: water guiding groove; 212: lower cover plate; 213: supporting platform; 22: RO filter membrane; 23: annular inner cover; 231: waste water cavity; 232: waste water opening;

30: internal tube; 31: inner enclosing plate; 32: inner lower cover; 301: sealing ring;

40: second filter assembly; 41: PAC framework; 42: PAC filter membrane; 43: PAC upper end cover; 431: upward flange; 44: PAC lower end cover; 440: engaging protrusion; 441: lower flange; 442: glue blocking ring; 443: protrusion;

50: third filter assembly; 51: first water purification cavity; 52: pure water cavity; 521: water outlet cavity; 522: original pure water cavity; 53: tap water cavity; 54: second water purification cavity;

60: water outlet tube.

DETAILED DESCRIPTION OF THE DISCLOSURE

Reference will be made in detail to embodiments of the present application, and the examples of the embodiments are illustrated in the drawings, and the same or similar elements and the elements having same or similar functions are denoted by like reference numerals throughout the descriptions. The embodiments described herein with reference to drawings are illustrative, and merely used to explain the present application. The embodiments shall not be construed to limit the present application.

In the description of the present application, it is to be understood that terms such as "center", "longitudinal", "transverse", "length", "width", "thickness", "upper", "lower", "front", "rear", "left", "right", "vertical", "horizontal", "top", "bottom", "inner", "outer", "clockwise", "anti-clockwise", "axial", "radial", and "circumferential" should be construed to refer to the orientation as shown in the drawings. These relative terms are for convenience of description and do not require that the present application be constructed or operated in a particular orientation, thus cannot be construed to limit the present application. Furthermore, the feature defined with "first" and "second" may include one or more of this feature explicitly or implicitly. In the description of the present application, "a plurality of" means two or more unless otherwise stated.

In the description of the present application, it should be noted that unless specified or limited otherwise, the terms "mounted", "connected", and "coupled" and the like are used broadly, and may be, for example, fixed connections, detachable connections, or integral connections; may also be mechanical or electrical connections; may also be direct connections or indirect connections via intervening structures; may also be inner communications of two elements.

A combined filter unit 100 and a water treatment apparatus having the same according to the embodiments of the present application will be described below with reference to FIGS. 1 to 28.

Figure 3:
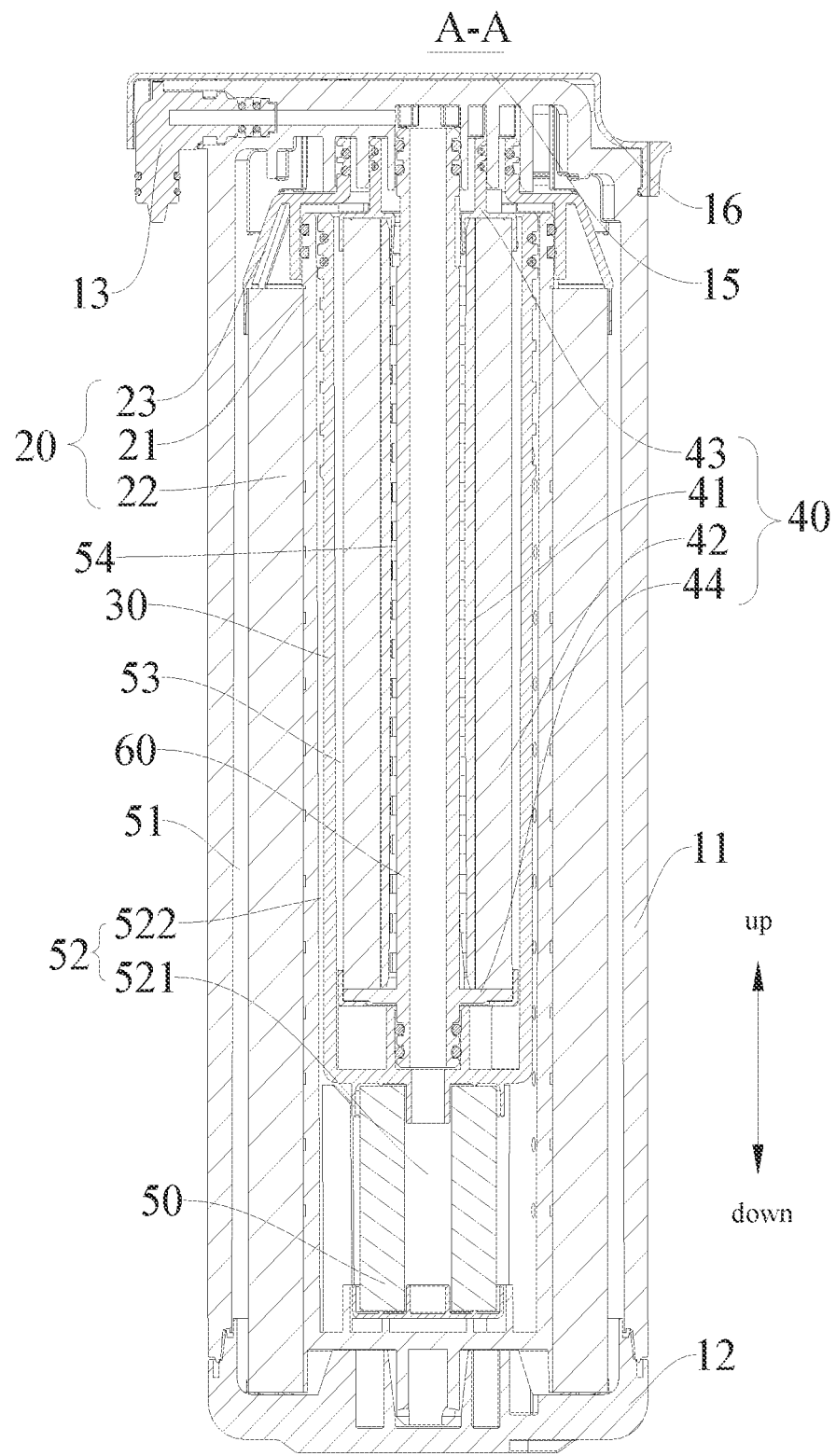
FIG. 3 is a sectional view taken along line A-A of FIG. 1.

As shown in FIGS. 1 and 3, according to the embodiments of the present application, the combined filter unit 100 includes: a housing 10, a first filter assembly 20, an internal tube 30, and a second filter assembly 40.

In one embodiment, the first filter assembly 20 is provided in the housing 10, and defines a filter material installation cavity 210 therein, and by providing the filter material installation cavity 210 in the first filter assembly 20, the internal tube 30 is provided in the filter material installation cavity 210, and the second filter assembly 40 is provided in the internal tube 30.

The internal tube 30 is formed in a tubular shape with one open end and the other closed end, the internal tube 30 may divide the filter material installation cavity 210 into an inner cavity and an outer cavity, the second filter assembly 40 is provided in the inner cavity, and since one side of the filter material installation cavity 210 is open, water flow may not only pass through and be filtered by the first filter assembly 200, but also enter the inner cavity through an opening of the filter material installation cavity 210 and be filtered by the second filter assembly 40.

Thus, in the combined filter unit 100 according to the embodiments of the present application, the second filter assembly 40 is provided in the internal tube 30 which is provided in the first filter assembly 20, that is, the first filter assembly 20, the internal tube 30 and the second filter assembly 40 are nested in sequence, and a space in the first filter assembly 20 is utilized fully, the first and second filter assemblies 20, 30 are spaced apart by the internal tube 30 and combined in the housing 10, a filtering effect of the combined filter unit 100 is improved, and two filter tubes may be accommodated in a space accommodating one filter unit originally, thus saving an occupied space of the first and second filter assemblies 20, 40.

In one embodiment, the internal tube 30 is detachably provided in the filter material installation cavity 210, and the detachable internal tube 30 is easy to assemble, thus providing convenience for assembly of the first filter assembly 20.

One end of the internal tube 30 is open, the internal tube 30 is provided in the housing 10 and divides an internal cavity of the housing 10 into an inner cavity and an outer cavity, the first filter assembly 20 is located in the outer cavity, and the second filter assembly 40 is located in the inner cavity.

The internal tube 30 is formed in a cylindrical shape with one open end, the closed end of the cylindrical internal tube 30 is inserted into the housing 10, and an opening of the internal tube 30 is hermetically connected with an inner wall of the housing 10.

As shown in FIG. 3, water pressure inside the internal tube 30 is higher than water pressure outside the internal tube 30, the pressure inside the internal tube 30 is higher than pressure between the internal tube 30 and the housing 10, and the internal tube 30 is forced towards the inside of the housing 10 under the action of the high pressure inside the internal tube 30; that is, the pressure only presses the internal tube 30 towards the inside of the housing 10, to prevent the internal tube 30 from being separated from the housing 10.

Thus, in the combined filter unit 100 according to the embodiments of the present application, the first and second filter assemblies 20, 40 are spaced apart by the internal tube 30 and combined in the housing 10, which may not only save the occupied space of the first and second filter assemblies 20, 40, but also improve the filtering effect of the combined filter unit 100. Since the water pressure inside the internal tube 30 is higher than the water pressure outside the internal tube, along with the use of the combined filter unit 100, the internal tube 30 is gradually moved towards the inside of the housing 10 under the action of the water pressure, thus gradually improving fitting stability of the internal tube 30 and the housing 10, and preventing separation of the internal tube 30.

The filter material installation cavity 210 has an open top, the internal tube 30 has an open top and is mounted in the first filter assembly 20 from the top of the filter material installation cavity 210, and an outer circumferential wall of the internal tube 30 abuts against an inner circumferential wall of the filter material installation cavity 210. An inner diameter of an upper portion of the filter material installation cavity 210 is kept constant or gradually reduced in the direction from top to bottom, and the water pressure inside the internal tube 30 applies a downward force to the internal tube 30 to prevent the internal tube 30 from being separated from the filter material installation cavity 210; and moreover, the inner diameter of the upper portion of the filter material installation cavity 210 is gradually reduced in the direction from top to bottom, and when the internal tube 30 is moved downwards, a sealing effect between the outer circumferential wall of the internal tube 30 and an inner circumferential wall of the first filter assembly 20 is gradually increased, and tightness of the combined filter unit 100 is also increased.

Figure 2:
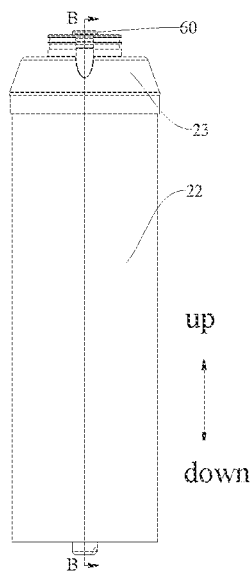
FIG. 2 is a schematic diagram of a structure located in a housing of the combined filter unit according to the embodiments of the present application.
Figure 4:
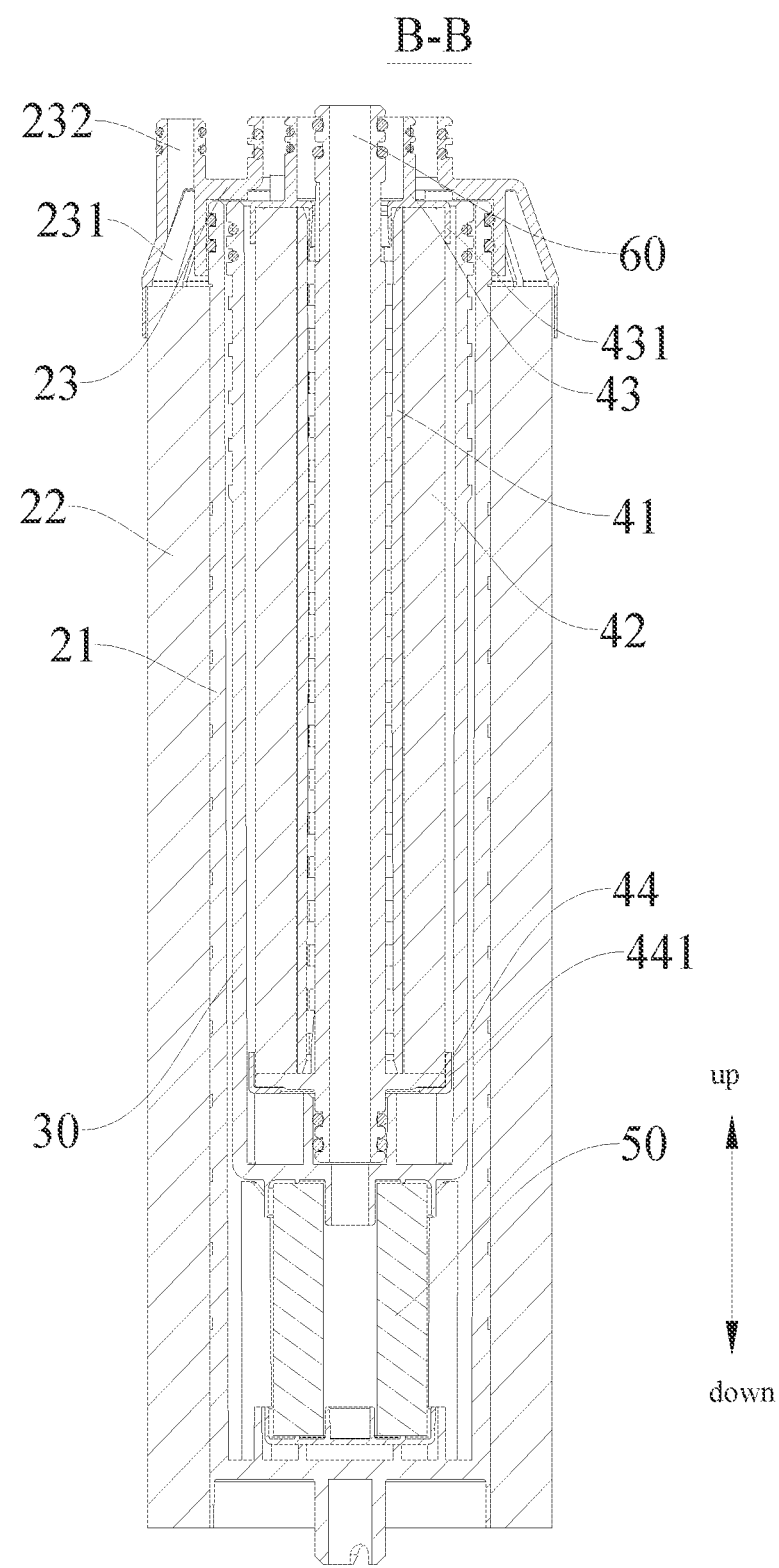
FIG. 4 is a sectional view taken along line B-B of FIG. 2.

As shown in FIGS. 2 to 4, a length of the filter material installation cavity 210 in the axial direction of the internal tube 30 is greater than a length of the internal tube 30; that is, when an upper edge of the internal tube 30 abuts against an upper edge of the filter material installation cavity 210, there exists a distance between a bottom of the internal tube 30 and a bottom of the filter material installation cavity 210, thus providing a moving space for the water pressure to press the internal tube 30 downwards, and preventing untight seal between the upper edge of the internal tube 30 and the upper edge of the filter material installation cavity 210 caused when a lower end of the internal tube 30 is unable to be moved downwards. Moreover, a space at the lower end of the internal tube 30 may be configured to accommodate water purified by the first filter assembly 20, thus improving a performance of the combined filter unit 100.

In some embodiments, an outer diameter of an upper end edge of the internal tube 30 is equal to an inner diameter of an upper end edge of the filter material installation cavity 210, and when the internal tube 30 is accommodated in the filter material installation cavity 210, an upper edge of the outer circumferential wall of the internal tube 30 hermetically abuts against an upper edge of the inner circumferential wall of the filter material installation cavity 210 when an upper edge of the internal tube 30 is flush with an upper edge of the filter material installation cavity 210. The internal tube 30 is prevented from continuously sliding downwards in the filter material installation cavity 210, which improves stability of the combined filter unit 100.

Figure 8:
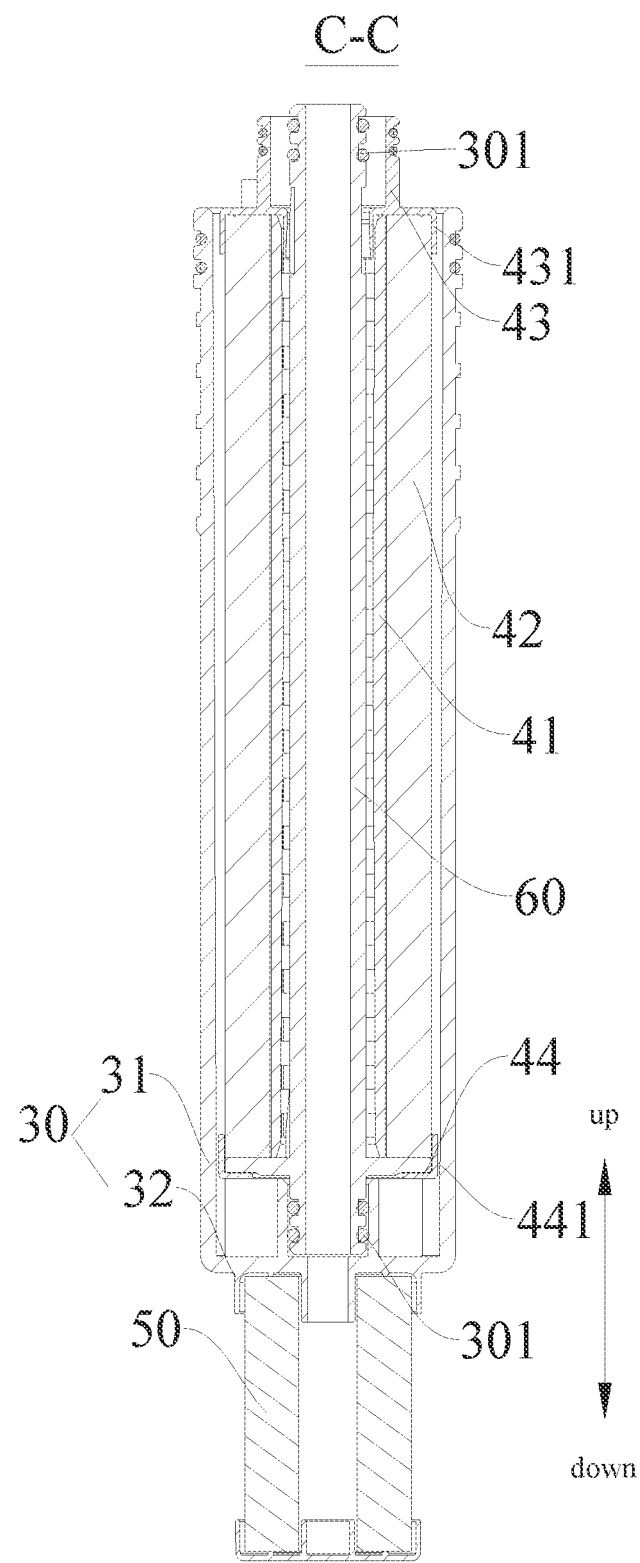
FIG. 8 is a sectional view taken along line C-C of FIG. 7.
Figure 27:
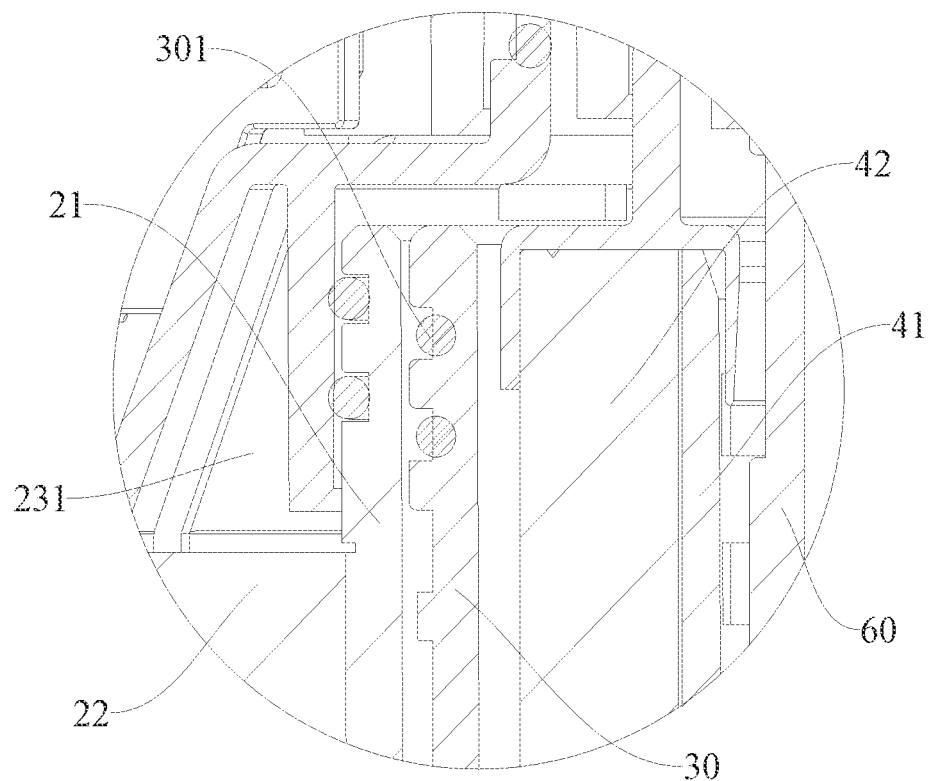
FIG. 27 is a partial enlarged view of FIG. 3.

As shown in FIGS. 8 and 27, in some embodiments, a sealing ring 301 is provided between the outer circumferential wall of the internal tube 30 and an inner wall of a central tube 21, and fitted over the internal tube 30, and by providing the sealing ring 301 between the internal tube 30 and the central tube 21, tightness between the internal tube 30 and the central tube 21 may be improved to prevent leakage of high-pressure water flow.

Further, a sealing-ring installation groove is defined in an upper portion of the outer circumferential wall of the internal tube 30, recessed inwards in the radial direction of the internal tube 30, and extends in the circumferential direction of the internal tube 30, a radial inner side of the sealing ring 301 is accommodated in the sealing-ring installation groove, and a width of the sealing ring 301 is greater than a depth of the sealing-ring installation groove; that is, a radius of an outer ring minus a radius of an inner ring of the sealing ring 301 is greater than the depth of the sealing-ring installation groove. When the sealing ring 301 is installed in the sealing-ring installation groove, an outer circumferential edge of the sealing ring 301 protrudes out of the outer circumferential wall of the internal tube 30, and is fitted with an inner circumferential wall of the central tube 21 to seal a gap between the upper edge of the internal tube 30 and an upper edge of the central tube 21.

The arrangement of the sealing-ring installation groove may improve not only a sealing performance of the sealing ring 301, but also stability of assembly of the sealing ring 301 at the internal tube 30, to prevent the sealing ring 301 from sliding in the axial direction of the internal tube 30 under the action of the water pressure. When the sealing ring 301 is assembled at the internal tube 30, an outer diameter of the sealing ring 301 is greater than a diameter of the opening of the filter material installation cavity 210, and convenience may be provided for assembly of the sealing ring 301 by providing the sealing-ring installation groove.

According to some embodiments of the present application, the first filter assembly 20 is configured as an RO filter unit (i.e., a reverse osmosis membrane filter unit), and the second filter assembly 40 is configured as a PAC filter unit. In one embodiment, the PAC filter unit has a wall thickness greater than 1 mm. Thus, under the condition of meeting a filtering requirement of the combined filter unit 100, the above-mentioned combined first and second filter assemblies 20, 40 occupy a minimum space, may improve a utilization efficiency of a space inside the housing 10 to the maximum extent, is beneficial to reduction of a volume of the combined filter unit 100, and provides convenience for a user.

As shown in FIG. 1, in the combined filter unit 100 according to some embodiments of the present application, the housing 10 is provided with a first water inlet 111, a first water outlet 112, a second water inlet 113 and a second water outlet 114, and the first water inlet 111 and the first water outlet 112 are communicated with the filter material installation cavity 210.

An outer wall of the first filter assembly 20 and an inner wall of the housing 10 define a first water purification cavity 51 in communication with the second water inlet 113, an inner wall of the first filter assembly 20 and an outer wall of the internal tube 30 define a pure water cavity 52 in communication with the second water outlet 114, an inner wall of the internal tube 30 and an outer wall of the second filter assembly 40 define a tap water cavity 53 in communication with the first water inlet 111, and a second water purification cavity 54 in communication with the first water outlet 112 is defined in the second filter assembly 40.

Water flow enters the tap water cavity 53 through the first water inlet 111, water flow in the tap water cavity 53 enters the second water purification cavity 54 under a filtering effect of the second filter assembly 40, and flows out through the first water outlet 112, purified water which flows out enters the first water purification cavity 51 through the second water inlet 113 under the action of a booster pump, water flow in the first water purification cavity 51 enters the pure water cavity 52 under a filtering effect of the first filter assembly 20, and water flow in the pure water cavity 52 flows out through the second water outlet 114 for the user to drink.

The first water inlet 111 of the combined filter unit 100 is in communication with a tap water tube in the home of the user, and water flow in the tap water tube enters the tap water cavity 53 through the first water inlet 111; that is, water pressure in the tap water cavity 53 is equal to water pressure in the home of the user. The second water outlet 114 is in communication with the atmosphere for the user to take water; that is, water pressure in the pure water cavity 52 is equal to the atmospheric pressure. Generally, the water pressure of tap water is much greater than the atmospheric pressure, and therefore, the internal tube 30 is moved towards the inner wall of the housing 10 under the action of the water pressure of the tap water and is not separated from the housing 10.

The first water purification cavity 51 is defined outside the first filter assembly 20, and the water flow is pressurized to flow into the first water purification cavity 51, and flows out from the second water outlet 114 under the filtering effect of the first filter assembly 20; that is, in the filtering process of the first filter assembly 20, the water flow permeates from outside to inside, for example, when the first filter assembly 20 is configured as the RO filter unit, the water flow is pressurized by the booster pump and then permeates from the outside to the inside of the first filter assembly 20, thus preventing influences on a pressure difference between the inside and the outside of the internal tube 30 caused when high-pressure water flow enters the outside of the internal tube 30, and then preventing influences on stability of the internal tube 30 caused by a water pressure change.

The second water purification cavity 54 is defined inside the first filter assembly 20, and the high-pressure water flow in the tap water cavity 53 permeates through the first filter assembly 20 and then flows out of the second water purification cavity 54, which also prevents influences on pressure balance between the inside and the outside of the internal tube 30 caused by leakage of the high-pressure water flow in the tap water cavity 53.

In some embodiments, as shown in FIG. 8, the internal tube 30 includes an inner enclosing plate 31 and an inner lower cover 32, the inner enclosing plate 32 is formed in a tubular shape extending in the axial direction of the housing 10, and has an open upper end, an upper end edge of the inner enclosing plate 32 is hermetically connected with the inner wall of the housing 10, and the second filter assembly 40 is provided in the inner enclosing plate 31, extends in the axial direction of the inner enclosing plate 31, and has a length less than or equal to a length of the inner enclosing plate 31. The inner lower cover 32 is connected to and seals a lower end of the inner enclosing plate 31.

The high-pressure tap water acts on upper surfaces of the inner enclosing plate 31 and the inner lower cover 32 of the internal tube to provide a downward acting force for the internal tube 30, and in a use process of the combined filter unit 100, a sealing effect of the internal tube 30 is enhanced gradually, which may not only prevent the internal tube 30 from being separated from the housing 10, and improve a sealing effect of the combined filter unit 100.

In some embodiments, the inner wall of the housing 10 and the outer wall of the first filter assembly 20 have a gap of 1.2 mm, the inner wall of the first filter assembly 20 and the outer wall of the internal tube 30 have a gap of 1.2 mm, and the inner wall of the internal tube 30 and the outer wall of the second filter assembly 40 have a gap of 1.2 mm, thus not only guaranteeing normal passing of the water flow, but also reducing volumes of the first filter assembly 20 and the housing 10 to improve a space utilization efficiency.

Moreover, the inner wall of the housing 10, the inner and outer walls of the first filter assembly 20, the inner and outer walls of the internal tube 30, as well as the outer wall of the second filter assembly 40 cooperate to define the first and second water purification cavities 51, 54, the tap water cavity 53 and the pure water cavity 52, which achieves a simple structure and easy realization, facilitates simplification of a structural design of the combined filter unit 100, and may reduce a production cost of the combined filter unit 100.

As shown in FIGS. 3 and 4, in some embodiments, the first filter assembly 20 includes the central tube 21, an RO filter membrane 22 and an annular inner cover 23, and the central tube 21 extends in the axial direction of the housing 10 and has an open upper end defining the filter material installation cavity 210, the internal tube 30 is provided in the central tube 21, the pure water cavity 52 is defined between the inner wall of the central tube 21 and the outer wall of the internal tube 30, and the RO filter membrane 22 is configured as a reverse osmosis filter membrane, is fitted over the central tube 21 and extends in the axial direction of the central tube 21. The annular inner cover 23 is fitted over the central tube 21, and has an inner circumferential edge hermetically abutting against the upper edge of the internal tube 30 and a lower surface in sealing fit with an upper end surface of the RO filter membrane 22.

Figure 9:
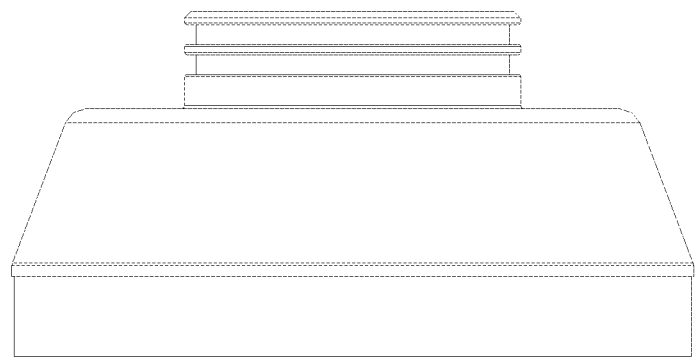
FIG. 9 is a schematic structural diagram of an annular inner cover according to the embodiments of the present application.
Figure 10:
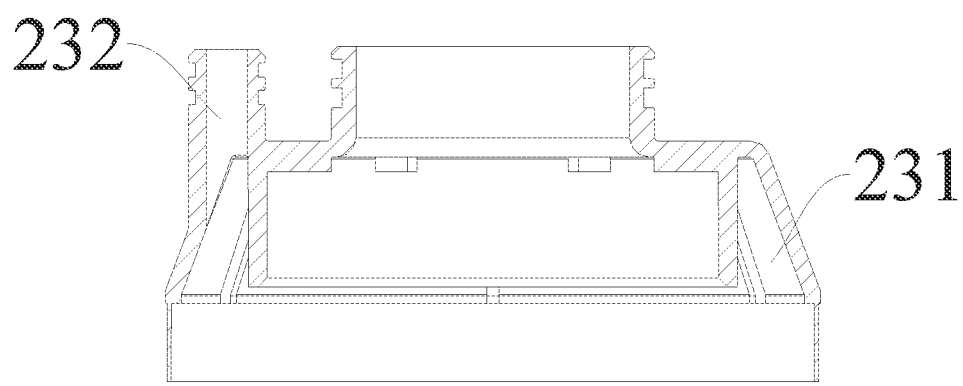
FIG. 10 is a sectional view of the annular inner cover according to the embodiments of the present application.
Figure 11:
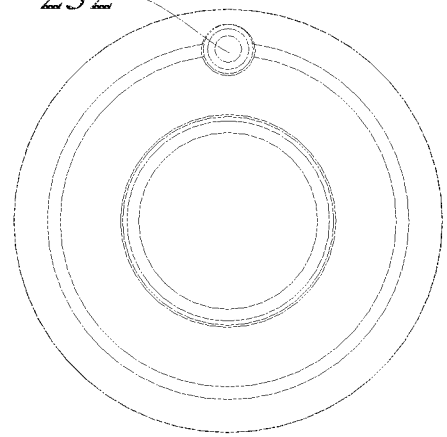
FIG. 11 is a top view of the annular inner cover according to the embodiments of the present application.

Further, as shown in FIGS. 9 to 11, a waste water opening 232 is defined at the annular inner cover 23, a waste water groove with an open lower surface is defined in the annular inner cover 23, and extends in the circumferential direction of the annular inner cover 23, the upper end surface of the RO filter membrane 22 and the annular inner cover 23 cooperate to close the waste water groove to form a waste water cavity 231, and a waste water channel communicating the waste water cavity 231 with the third water outlet 115 is defined in the annular inner cover 23.

Waste water is separated by the RO filter unit in the filtering process, and may be guided to be discharged by providing the waste water opening 232, the waste water cavity 231 and the waste water channel. The definition of the waste water cavity 231 at the annular inner cover 23 may prevent the waste water from being introduced into the first water purification cavity 51, the pure water cavity 52, the tap water cavity 53 and the second water purification cavity 54, and thus improve quality of the filtered water flow. The waste water of the RO filter unit is discharged from an end portion thereof, and the definition of the waste water cavity 231 at the annular inner cover 23 may provide convenience for the waste water to enter the waste water cavity 231, achieve a simple structure, eliminate a flow guiding channel 1431 between the RO filter unit and the waste water cavity 231, and simplify the structural design and a water route design of the combined filter unit 100.

The third water outlet 115 in communication with the waste water opening 232 is defined at a top of the housing 10, the waste water in the waste water cavity 231 is discharged through the third water outlet 115, the third water outlet 115 is provided with a waste water plug 14 connected with the housing 10, and when the waste water in the waste water cavity 231 reaches certain pressure, the waste water plug 14 is opened, and the waste water is discharged.

As shown in FIGS. 3 and 4, in some embodiments, the second filter assembly 40 is configured as a PAC filter unit, and includes a PAC framework 41 and a PAC filter membrane 42, the PAC framework 41 is located in the internal tube 30 and extends in the axial direction of the internal tube 30, and the PAC filter membrane 42 is fitted over the PAC framework 41 and extends in the axial direction of the PAC framework 41. The PAC filter membrane 42 is fitted over the PAC framework 41 and extends in the axial direction of the PAC framework 41, and an annular upper end cover 43 is fitted over a water outlet tube 60, and has a lower end surface hermetically abutting against an upper end surface of the PAC filter membrane 42 to prevent the water flow from passing through the PAC filter membrane 42 and then flowing out from the upper end surface of the PAC filter membrane 42.

In one embodiment, the PAC filter membrane 42 is configured as a tubular filter made of a polyaluminum chloride material, and has a thickness greater than 1 mm.

In some examples of the present application, the PAC filter membrane 42 is configured as a roll made of a non-woven fabric, a polypropylene layer, and carbon fibers, and has a long service life. When the PAC filter membrane is configured to filter the tap water, silt, rust and residual chlorine may be removed preliminarily. Certainly, the second filter assembly 40 may also be made by rolling a filtering layer made of only one or two materials, which is not specifically limited herein.

A filtering effect of the PAC filter membrane 42 is related to a wall thickness thereof, and the thicker the wall of the PAC filter membrane 42, the better the filtering effect, and when the wall thickness of the PAC filter membrane 42 is greater than 1 mm, a filtering requirement of the user for the water flow may be met. The filtering effect of the reverse osmosis filter unit is related to the area of the wound filter membrane. Therefore, the filter material installation cavity 210 is defined in the reverse osmosis filter unit, and the PAC filter membrane 42 is provided in the reverse osmosis filter unit, and a volume of the PAC filter membrane 42 may be reduced while the filtering effect of the PAC filter membrane 42 is guaranteed, thus reducing an occupied space of the PAC filter membrane 42; moreover, the production material of the PAC filter membrane 42 may be reduced, thus saving a cost; and the reverse osmosis filter unit is provided outside the PAC filter membrane 42, and has a large diameter, and the wall thickness of the reverse osmosis filter unit may be reduced in the case of winding the same-area filter membrane, which may also reduce the occupied space of the reverse osmosis filter unit.

Thus, under the condition of meeting the filtering requirement of the combined filter unit 100, the above-mentioned combined first and second filter assemblies 20, 40 occupy a small space, may improve the utilization efficiency of the space inside the housing 10 to the maximum extent, is beneficial to reduction of the overall volume of the combined filter unit 100, and provides convenience for the user.

The PAC framework 41 defines the second water purification cavity 54 therein, an outer wall of the PAC filter membrane 42 and the inner wall of the internal tube 30 define the tap water cavity 53, the tap water enters the tap water cavity 53 through the first water inlet 111, and the water flow passes through the PAC filter membrane 42, flows out from an inner wall of the PAC framework 41 to enter the second water purification cavity 54 through the filtering effect of the PAC filter membrane 42, and then flows out through the first water outlet 112.

Since the filtering effect of the PAC filter membrane 42 is related to the thickness of the PAC filter membrane 42 through which the water flow passes, the PAC filter membrane 42 and the PAC framework 41 form the second filter assembly 40 and are provided in the internal tube 30, and a diameter of the second filter assembly 40 is reduced, thus reducing the occupied space of the second filter assembly 40; and moreover, the volume and the production material of the PAC filter membrane 42 may be reduced, thus facilitating reduction of the cost.

Further, the PAC framework 41 is tubular, and the wall of the PAC framework 41 is provided with holes running through the wall of the PAC framework 41 in the thickness direction of the wall of the PAC framework 41. The arrangement of the holes in the wall of the PAC framework 41 may motivate the water flow in the PAC filter membrane 42 to enter the second water purification cavity 54 through the holes.

As shown in FIGS. 3 and 8, in some embodiments, the second filter assembly 40 further includes a PAC upper end cover 43 and a PAC lower end cover 44, the PAC upper end cover 43 is fitted over an upper end of the PAC framework 41, and has a lower surface hermetically abutting against the upper end surface of the PAC filter membrane 42, and the PAC lower end cover 44 is fitted over a lower end of the PAC framework 41, and has an upper surface hermetically abutting against a lower end surface of the PAC filter membrane 42.

The arrangement of the PAC upper and lower end covers 43, 44 may improve tightness of upper and lower ends of the PAC filter membrane 42 to prevent the water flow in the PAC filter membrane 42 from flowing out from the upper or lower end of the PAC filter membrane 42, which may not only prevent the water flow from entering a water outlet cavity 521, but also improve tightness of the tap water cavity 53.

As shown in FIG. 8, in some embodiments, an upper flange 431 folded downwards is formed at an outer circumferential edge of the PAC upper end cover 43, and has an inner wall abutting against an outer circumferential wall of the PAC filter membrane 42, and an outer wall of the upper flange 431 and the inner wall of the internal tube 30 define a tap water channel through which the water flow enters the tap water cavity 53 from the first water inlet 111.

A lower flange 431 folded upwards is formed at an outer circumferential edge of the PAC lower end cover 43, and has an inner wall abutting against the outer circumferential wall of the PAC filter membrane 42. Thus, a performance of the second filter assembly 40 may be improved, the tightness and reliability of the tap water cavity 53 may be improved, and water flow leakage may be prevented.

Figure 5:
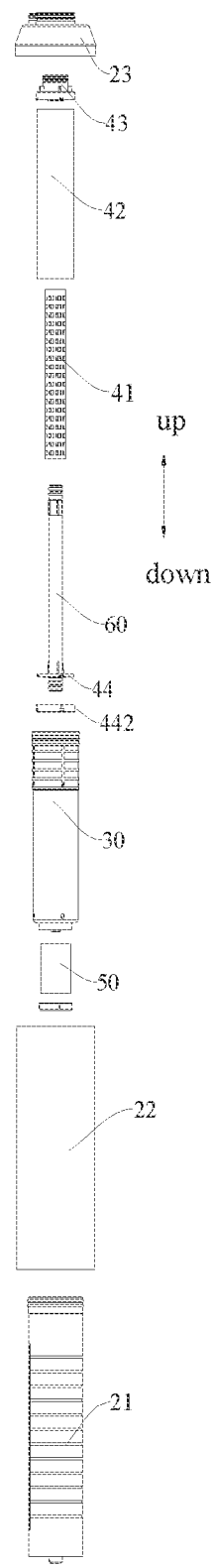
FIG. 5 is an exploded view of the mechanism of FIG. 4.

As shown in FIGS. 4, 5 and 8, when an outer circumferential wall of the water outlet tube 60 is provided with the PAC lower end cover 44, the second filter assembly 40 is glued at the PAC lower end cover 44, and better seal is formed between the glued PAC lower end cover 44 and second filter assembly 40, and the water flow with different water qualities on both sides of the second filter assembly 40 is not prone to mixture at the bottom.

Figure 28:
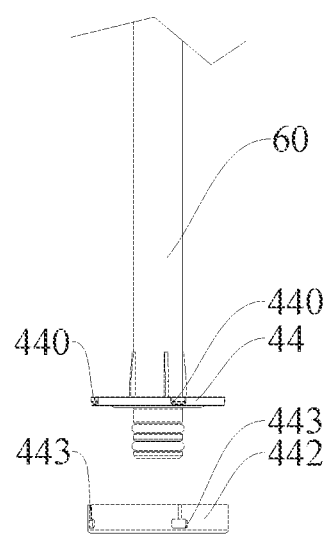
FIG. 28 is a schematic partial enlarged diagram of a water outlet tube and a glue blocking ring according to some embodiments.

In addition, as shown in FIG. 28, a glue blocking ring 442 is fitted over the water outlet tube 60, and has an outer circumferential edge provided on an outer circumferential side of the PAC lower end cover 44 for blocking. In the present application, the water outlet tube 60 with the above-mentioned structure of the glue blocking ring 442 and the PAC lower end cover 44 may be separated from the glue blocking ring 442 during fabrication without affecting a half-and-half mold opening operation and large-scale fabrication of the water outlet tube 60, and the whole water outlet tube 60 is conveniently assembled after fabrication is completed, and then assembled with the glue blocking ring 442, thus greatly improving a manufacturing efficiency.

The glue blocking ring 442 may also reduce glue which overflows from a gap between the PAC lower end cover 44 and the second filter assembly 40 in a gluing process, thus preventing the overflowing glue from affecting the filtering effect.

As shown in FIGS. 3 to 8, the second filter assembly 40 is provided around the water outlet tube 60, the PAC lower end cover 44 is formed as an annular plate and connected to an end surface of the second filter assembly 40, and the glue blocking ring 442 includes a connecting ring and a sealing ring, the sealing ring is formed in a cylindrical shape and fitted over outsides of the second filter assembly 40 and the PAC lower end cover 44, and the connecting ring extends radially inwards from the end edge of the sealing ring away from the second filter assembly 40.

The connecting ring may further prevent the glue from overflowing circumferentially during the seal between the second filter assembly 40 and the PAC lower end cover 44. The sealing ring may increase contact between the connecting ring and the PAC lower end cover 44 and prevent the glue from overflowing through a gap where the connecting ring and the PAC lower end cover 44 are connected. A lower circumferential edge of the sealing ring is connected with an outer circumferential edge of the connecting ring, an inner circumferential wall of the sealing ring hermetically abuts against the outer circumferential wall of the PAC filter membrane 42, and the glue blocking ring 442 has a cross section formed into an L shape.

In one embodiment, as shown in FIG. 28, an engaging protrusion 440 is provided at the PAC lower end cover 44, and an engaging hole (not shown) engaged with the engaging protrusion 440 is defined at the glue blocking ring 442. The engaging protrusion 440 is engaged with the engaging hole, and the glue blocking ring 442 may be further clamped at the PAC lower end cover 44 on the basis of being fitted over the water outlet tube 60, thus conveniently assembling the glue blocking ring 442 at the water outlet tube 60, and improving connection reliability and assembly simplicity. Meanwhile, after disassembly, the glue blocking ring 442 may also be used as an independent component, and a gluing effect and a filtering effect of the second filter assembly 40 are not influenced, and manufacturability is improved greatly.

In one embodiment, the position of the glue blocking ring 442 corresponding to each engaging hole protrudes outwards to form a protrusion 443, and the glue blocking ring 442 may conveniently come into contact with an external component and be positioned.

In one embodiment, as shown in FIG. 5, the water outlet tube 60 is configured as an integral injection molded part, and the PAC lower end cover 44 is integrally molded at the water outlet tube 60 by injection. The PAC lower end cover 44 and the water outlet tube 60 are integrally molded by injection, and thus may be conveniently manufactured with molds, and the PAC lower end cover 44 has an enough bearing capacity and is not prone to separation and fall from the water outlet tube 60. Skew is prevented in a long-time use process.

According to some embodiments of the present application, as shown in FIGS. 2 and 3, the combined filter unit 100 further includes a third filter assembly 50 provided in the pure water cavity 52, the third filter assembly 50 divides the pure water cavity 52 into an original pure water cavity 522 located outside the third filter assembly 50 and a water outlet cavity 521 located inside the third filter assembly 50, and the water outlet cavity 521 is communicated with the second water outlet 114.

That is, pure water filtered by the first filter assembly 20 enters the original pure water cavity 522, and water flow in the original pure water cavity 522 passes through the third filter assembly 50, and enters the water outlet cavity 521 through a filtering effect of the third filter assembly 50, thus further removing impurities or odor in the water. The first filter assembly 20 is configured as the RO filter unit, and the water filtered by the RO filter unit is faintly acid, has a poor taste, and is unsuitable for being directly drunk by the user, and a filtering effect of an activated carbon filter unit may further improve quality of the pure water and the taste of drinking water.

Moreover, the third filter assembly 50 is provided in the pure water cavity 52, thus further improving a combination degree of the combined filter unit 100 and the filtering effect of the combined filter unit 100 on water flow, and compared with a case where the third filter assembly 50 is provided independently, simplifying a water flow design of the combined filter unit 100, and reducing the volume of the combined filter unit 100.

As shown in FIG. 8, according to some embodiments of the present application, the third filter assembly 50 and the internal tube 30 are arranged in the axial direction of the first filter assembly 20; that is, the first filter assembly 20 defines therein the filter material installation cavity 210 extending in the axial direction of the first filter assembly 20.

In one embodiment, the sum of axial lengths of the internal tube 30 and the third filter assembly 50 is less than or equal to an axial length of the filter material installation cavity 210, the third filter assembly 50 is provided at the bottom of the filter material installation cavity 210, and the internal tube 30 is provided at a top of the third filter assembly 50.

The space of the filter material installation cavity 210 may be fully used by the third filter assembly 50 and the internal tube 30 which are arranged in the axial direction of the first filter assembly 20, which is beneficial to reduction of the internal diameter of the filter material installation cavity 210, and then may reduce the diameter and volume of the first filter assembly 20; and the third filter assembly 50 and the internal tube 30 which have the above-mentioned structure have simple structures and are assembled conveniently.

As shown in FIGS. 3 and 8, according to some embodiments of the present application, the combined filter unit 100 further includes the water outlet tube 60, the water outlet tube 60 runs through the internal tube 30 in the axial direction thereof, is inserted into the PAC framework 41, and has one end (lower end as shown in FIG. 8) in communication with the water outlet cavity 521, and the other end (upper end as shown in FIG. 8) in communication with the second water outlet 114, and the second water purification cavity 54 is defined between the inner wall of the PAC framework 41 and the outer wall of the water outlet tube 60.

In some embodiments, the second water outlet 114 is located above the internal tube 30, the water outlet cavity 521 is located in the third filter assembly 50 below the internal tube 30, and the water flow in the water outlet cavity 521 may conveniently flow out from the second water outlet 114 by providing the water outlet tube 60, and the water outlet tube 60 has a simple structure and is easy to implement.

Figure 12:
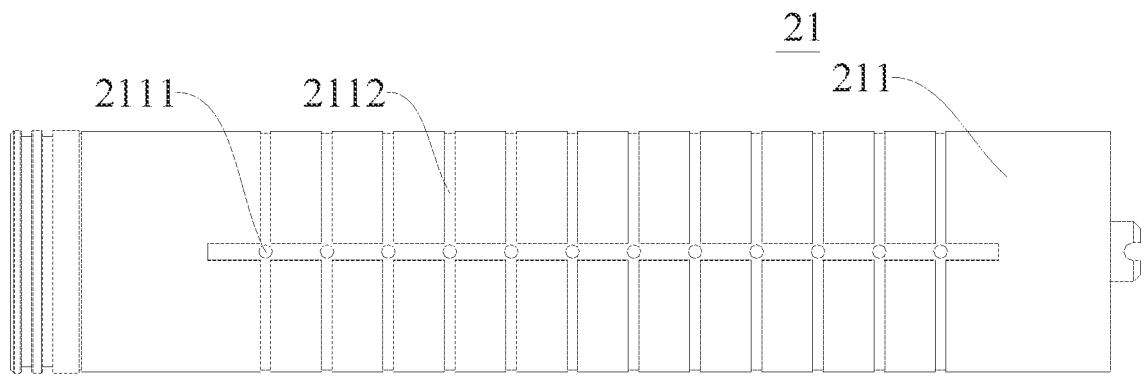
FIG. 12 is a schematic structural diagram of a central tube according to the embodiments of the present application.
Figure 13:
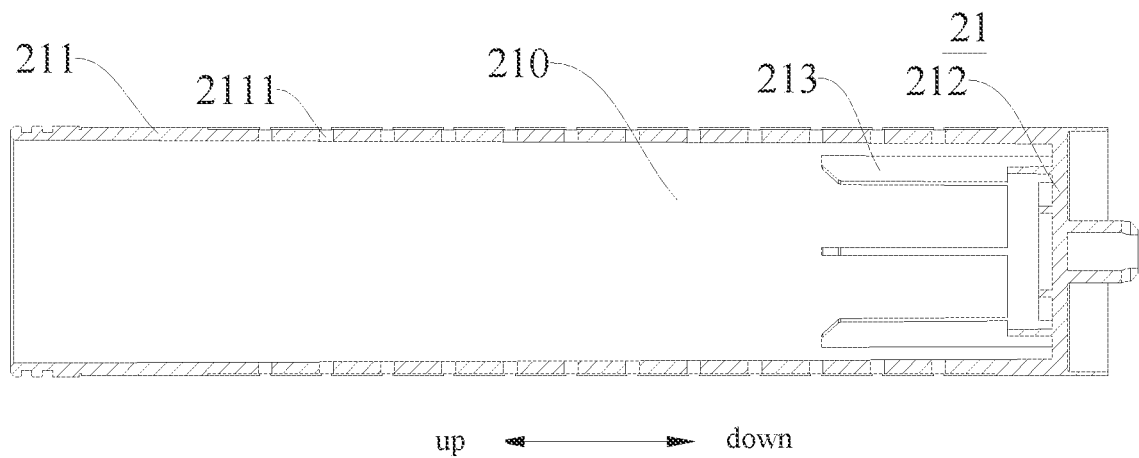
FIG. 13 is a sectional view of the central tube according to the embodiments of the present application.

In some embodiments, as shown in FIGS. 12 and 13, the central tube 21 includes an enclosing plate 211 and a lower cover plate 212, the enclosing plate 211 is formed in a cylindrical shape with two open ends, the RO filter membrane 22 is fitted over the enclosing plate 211, the lower cover plate 212 is provided in the enclosing plate 211 and located at a lower portion of the enclosing plate 211, closes the lower end opening of the enclosing plate 211 and cooperates with the enclosing plate 211 to define the filter material installation cavity 210, and a lower end of the third filter assembly 50 abuts against an upper surface of the lower cover plate 212. That is, the central tube 21 is formed in a cylindrical shape having an open upper end and a closed lower end, and an inner wall of the enclosing plate 211, the upper surface of the lower cover plate 212 and the outer surface of the internal tube 30 cooperate to define the pure water cavity 52.

A pure water through hole 2111 is defined on the wall of the central tube 21, and runs through the wall of the central tube 21 in the thickness direction of the wall of the central tube 21, the water flow enters the RO filter membrane 22 from the lower end of the RO filter membrane 22, the RO filter membrane 22 filters and separates the water flow into the waste water and the pure water, and the waste water flows out of the upper end of the RO filter membrane 22 and is discharged through the waste water cavity 231 and the third water outlet 115. The pure water flows out from the inner wall of the RO filter membrane 22, enters the pure water cavity 52 through the pure water through hole 2111, and is discharged through the second water outlet 114 for drinking by the user.

As shown in FIG. 12, a water guiding groove 2112 in communication with the pure water through hole 2111 is defined in an outer circumferential wall of the enclosing plate 211, and recessed inwards with respect to the outer circumferential wall of the enclosing plate 211, and the water flow filtered by the RO filter membranes 22 flows into the pure water through hole 2111 through the water guiding groove 2112, is collected in the filter material installation cavity 210, and is then guided out.

Since the RO filter membrane 22 is wound around the enclosing plate 211, the arrangement of the water guiding groove 2112 at the enclosing plate 211 may increase a flow efficiency of the water flow guided out from the RO filter membrane 22, increase a water outlet efficiency of the RO filter membrane 22, and then improve a water purification efficiency of an RO filter unit assembly.

As shown in FIG. 12, the water guiding groove 2112 extends in the circumferential direction of the enclosing plate 211; that is, the water guiding groove 2112 is formed in an annular shape extending in the circumferential direction of the enclosing plate 211, and the pure water through hole 2111 is defined in the water guiding groove 2112, thus further increasing a length of the water guiding groove 2112, further improving the water outlet efficiency of the RO filter membrane 22, and guaranteeing the uniform water outlet efficiency of the RO filter membrane 22 in the circumferential direction to prevent the water purification efficiency of the RO filter membrane 22 from being influenced by blockage of local water outlet.

The central tube 21 with the above-mentioned structure has the closed lower end, and the pure water flow may be prevented from being leaked from a lower end of the pure water cavity 52, and only tightness of the upper end of the central tube 21 is required to be paid attention to in the assembling process of the RO filter unit.

Figure 14:
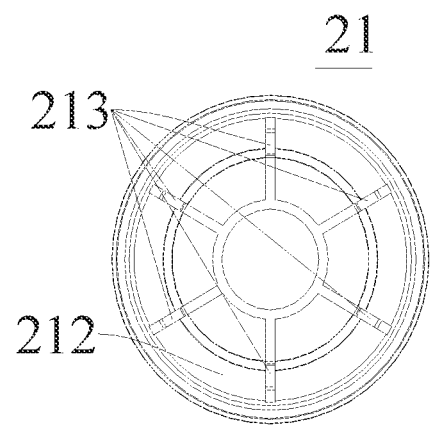
FIG. 14 is a side view of the central tube according to the embodiments of the present application.
Figure 15:
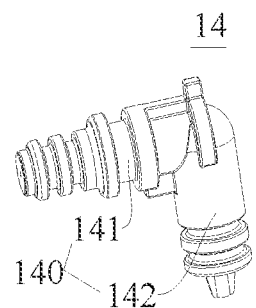
FIG. 15(a) is a schematic structural diagram of a waste water plug according to the embodiments of the present application.
FIG. 15(b) is a sectional view of the waste water plug according to the embodiments of the present application.
Figure 15:
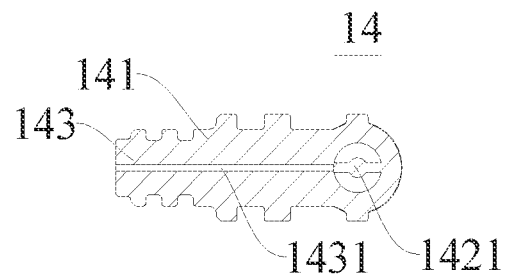

As shown in FIGS. 13 and 14, in some embodiments, a supporting platform 213 extending in the axial direction of the third filter assembly 50 is provided in the filter material installation cavity 210, and abuts between the lower end of the internal tube 30 and the bottom wall of the filter material installation cavity 210; that is, the supporting platform 213 may be provided outside the third filter assembly 50, the internal tube 30 may be supported by the supporting platform 213, and the supporting platform 213 may limit a distance by which the internal tube 30 slides downwards, to prevent the internal tube 30 from continuously sliding downwards, and prevent damage to the third filter assembly 50 due to excessive water pressure in the internal tube 30.

There are supporting platforms 213, the plurality of supporting platforms 213 are provided at intervals in the circumferential direction of the third filter assembly 50, and the arrangement of the plurality of supporting platforms 213 may improve supporting strength of the supporting platforms 213 and promote uniform stress of the internal tube 30. A pressing action of the internal tube 30 on the third filter assembly 50 is reduced, the damage to the third filter assembly 50 caused by the overlarge pressure of the internal tube 30 is prevented, and the service life of the third filter assembly 50 is prolonged. Further, the spaced supporting platforms 213 may motivate the water flow to pass through the third filter assembly 50, and the water flow passes between the adjacent supporting platforms 213, and then through the third filter assembly 50 into the water outlet cavity 521.

Further, the supporting platform 213 extends in the circumferential direction of the enclosing plate 211, that is, is formed in an annular shape extending along the circumferential direction of the enclosing plate 211, the supporting platform 213 may also extend along the axial direction of the enclosing plate 211 to form a tubular shape, a lower end of the supporting platform 213 abuts against the upper surface of the lower cover plate 212 of the central tube 21, and the third filter assembly 50 is provided in the supporting platform 213.

The tubular supporting platform 213 may improve the stress uniformity of the internal tube 30, and prevent the internal tube 30 from being damaged or inclined due to local uneven stress. The supporting platform 213, the enclosing plate 211 and the lower cover plate 212 are integrally formed; that is, the central tube 21 is configured as an integrally formed part, the integrally formed central tube 21 may improve connection stability and connection strength among the supporting platform 213, the enclosing plate 211 and the lower cover plate 212 to improve functional stability and reliability of the central tube 21, and may eliminate connecting mechanisms among the supporting platform 213, the enclosing plate 211 and the lower cover plate 212 to improve an assembly efficiency of the central tube 21 and the combined filter unit 100, and the integrally formed central tube 21 has large strength and a long service life.

Figure 6:
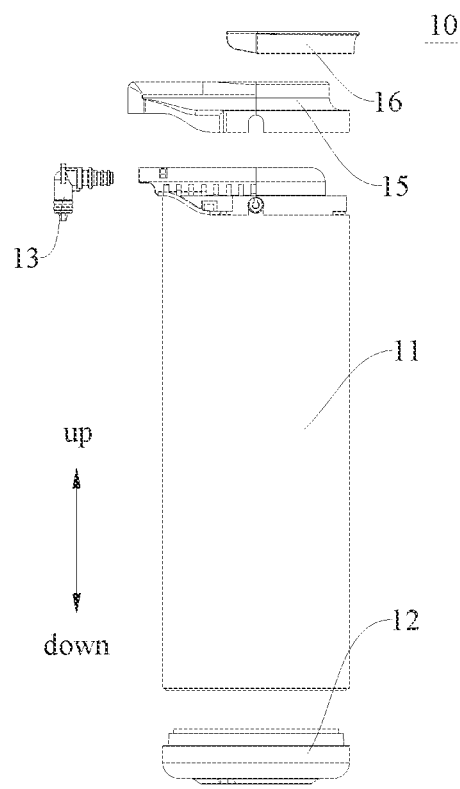
FIG. 6 is an exploded view of the housing of the combined filter unit according to the embodiments of the present application.
Figure 7:
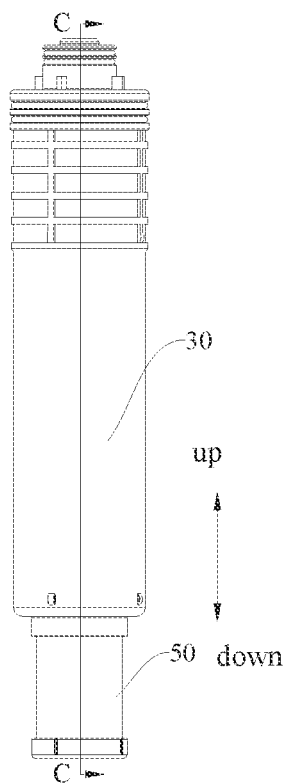
FIG. 7 is a schematic diagram in which an internal tube is fitted with a third filter assembly according to the embodiments of the present application.

As shown in FIG. 6, according to some embodiments of the present application, the housing 10 includes a cylinder 11 and a lower cover 12, a bottom of the cylinder is open, the first filter assembly 20 is provided in the cylinder 11, and the lower cover 12 closes a lower end of the cylinder 11.

In one embodiment, the first water inlet 111, the first water outlet 112, the second water inlet 113 and the second water outlet 114 are all defined at a top of the cylinder 11, the lower cover 12 is connected with the cylinder 11 to close the opening of the cylinder 11, and an upper surface of the lower cover 12 hermetically abuts against the lower end surface of the first filter assembly 20.

As shown in FIG. 1, the housing 10 is further provided with four adapters 13 inserted into the first water inlet 111, the first water outlet 112, the second water inlet 113 and the second water outlet 114 in one-to-one correspondence, and the arrangement of the adapters 13 provides convenience for assembly of water routes at the combined filter unit 100, and improves tightness of the water routes.

The waste water plug 14 is provided at and inserted into the third water outlet 115, and generates certain resistance to the water in the waste water cavity 231, and when the water pressure in the waste water cavity 231 reaches a preset pressure value, the waste water plug 14 is switched on, and the waste water is discharged from the waste water cavity 231.

In the present embodiment, as shown in FIGS. 15(a) and 15(b), the waste water plug 14 includes a sleeve 140 and capillary tubes 143, the sleeve 140 is inserted into the waste water outlet 115 and connected with the housing 10, and the capillary tubes 143 are provided at an inner wall of the sleeve 140 and extend inwards in the radial direction of the sleeve 140.

The number of the capillary tubes 143 is large, and the plurality of capillary tubes 143 are arranged in the circumferential direction of the sleeve 140 to form capillary tube 143 groups filled in the sleeve 140 in the axial direction of the sleeve 140. The waste water plug 14 with the above-mentioned structure has a simple structure, is easy to manufacture, and may effectively improve the water purifying effect of the RO filter unit assembly 20.

As shown in FIG. 15(a), in the present embodiment, the sleeve 140 includes an insertion section 141 and a guide section 142, the insertion section 141 has one end inserted into the waste water outlet 115, and extends along the axial direction of the waste water outlet 115, and the guide section 142 is communicated with the other end of the insertion section 141. The insertion section 141 and the guide section 142 are both provided therein with the capillary tubes 143, and the capillary tubes 143 may be provided in only one of the insertion section 141 and the guide section 142.

The sleeve 140 of the above-mentioned structure may increase the water pressure of the waste water outlet 115, and the insertion section 141 is inserted in the waste water outlet 115, with good stability and tightness; and the guide section 142 is suitable for communicating the waste water outlet 115 with a waste water drainage tube, and is perpendicular to the insertion section 141, and the waste water drainage tube is conveniently connected with the guide section 142 to provide convenience for waste water drainage.

As shown in FIGS. 15(a) and 15(b), according to one embodiment of the present disclosure, the capillary tubes 143 are provided in the insertion section 141, radial inner ends of the capillary tubes 143 cooperate to define the flow guiding channel 1431 with a small diameter, and when the water flow passes through the flow guiding channel 1431, water flow resistance is large; a water guiding post 1421 extending in the axial direction of the guide section 142 is provided in the guide section 142, and closes the flow guiding channel 1431; and the flow guiding channel 1431 is closed by the water guiding post 1421, and the water flow passes through the capillary tubes 143 to enter the guide section 142 from the insertion section 141, thus satisfying a pressurizing effect of the waste water plug 14 on the waste water cavity 231.

The housing 10 is further provided with a decorative cover 15 covering the top of the cylinder 11, and the first water inlet 111, the first water outlet 112, the second water inlet 113, the second water outlet 114 and the third water outlet 115 are all covered in the decorative cover 15, thus improving appearance regularity of the combined filter unit 100.

As shown in FIG. 1, in some embodiments, a handle 16 is further provided at the top of the cylinder 11, a first connection point and a second connection point which are spaced apart are provided at a side wall of the cylinder 11, the handle has one end connected with the first connection point, and the other end connected with the second connection point, and when the combined filter unit 100 is disassembled or assembled, the user may take and place the combined filter unit 100 by the handle 16, the operation is convenient, stability is high, and the handle 16 has a simple structure and is easy to implement.

As shown in FIGS. 16 to 26, the housing 10 is provided with a fixing structure 17, the handle 16 is provided with a fitting structure 161, and the fitting structure 161 may be rotatably fitted with the fixing structure 17. By fitting the fitting structure 161 with the fixing structure 17, the handle 16 may be rotatably connected to the housing 10, and the handle 16 may be conveniently and directly lifted without holding the housing 10 when the combined filter unit assembly 100 is taken and placed.

The fitting structure 161 has a first position and a second position relative to the fixing structure 17 in the rotation direction, may be inserted into the fixing structure 17 in the first position, and is engaged with the fixing structure 17 to form an anti-disengaging structure in the second position.

The fitting structure 161 at the handle 16 may be rotated in the fixing structure 17 and switched between the first and second positions, and at the first position, the fitting structure 161 is conveniently connected with the fixing structure 17, and only the fitting structure 161 is required to be inserted in the fixing structure 17, and the handle 16 is easily installed at the housing 10.

At the second position, the fitting structure 161 is engaged with the fixing structure 17, and firm connection is formed between the fitting structure 16 and the fixing structure 17 and may prevent disengagement, and therefore, the handle 16 may be lifted conveniently and prevented from being separated from the housing 10 in the lifting process of the handle 16.

Compared with a filter unit assembly without the handle or a filter unit assembly 100 in which the handle 16 is connected fixedly in the prior art, the combined filter unit assembly 100 with the above-mentioned handle 16 structure in the present application has installation convenience and a bearing performance in a use process after installation.

Figure 16:
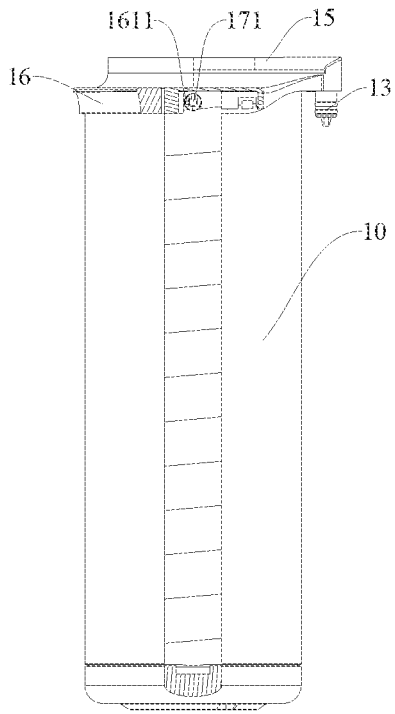
FIG. 16 is a schematic diagram of a fitting relationship between a first fixing structure and a first inserting structure of a combined filter unit assembly according to some embodiments of the present application at a first position.
Figure 17:
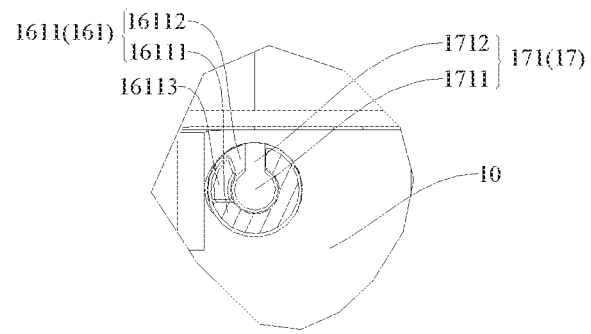
FIG. 17 is a schematic partial enlarged diagram in which the first fixing structure is fitted with the first inserting structure at the first position according to some embodiments of the present application.

In the handle 16 with the above connection and fitting structure, at the first position, as shown in FIGS. 16 and 17, when a shaft sleeve 16111 is aligned with a guide post 1711, a limiting post 1712 is aligned with a guide groove 16112. The guide post 1711 is inserted into the shaft sleeve 16111, and meanwhile, the limiting post 1712 is inserted into the guide groove 16112. That is, at the first position, the guide post 1711 and the limiting post 1712 are simultaneously inserted into the shaft sleeve 16111 and the guide groove 16112 without blockage, and the guide post 1711 and the limiting post 1712 may be pulled out from the shaft sleeve 16111 and the guide groove 16112 without blockage, which facilitates installation of the handle 16 at the housing 10.

Figure 18:
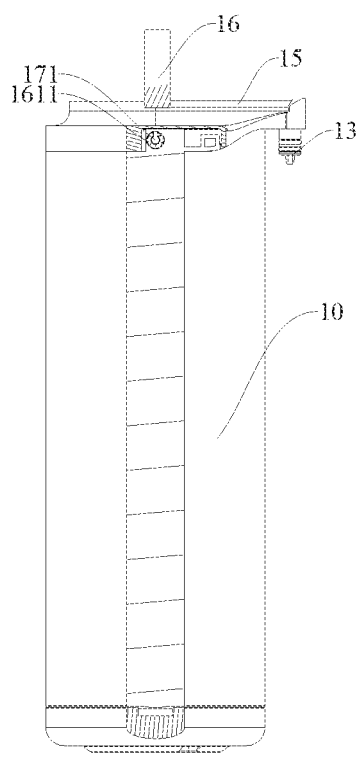
FIG. 18 is a schematic diagram of a fitting relationship between the first fixing structure and the first inserting structure of the combined filter unit assembly according to some embodiments of the present application at a second position.
Figure 19:
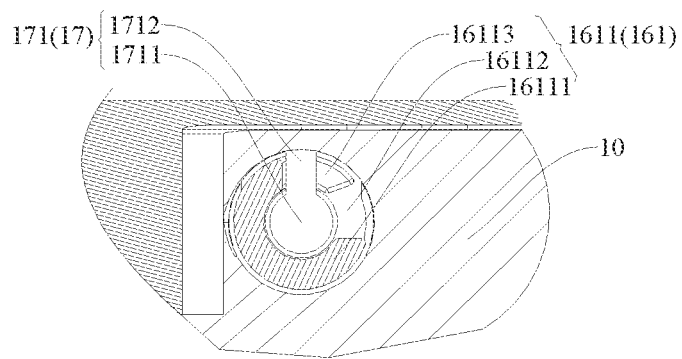
FIG. 19 is a schematic partial enlarged diagram in which the first fixing structure is fitted with the first inserting structure at the second position according to some embodiments of the present application.
Figure 20:
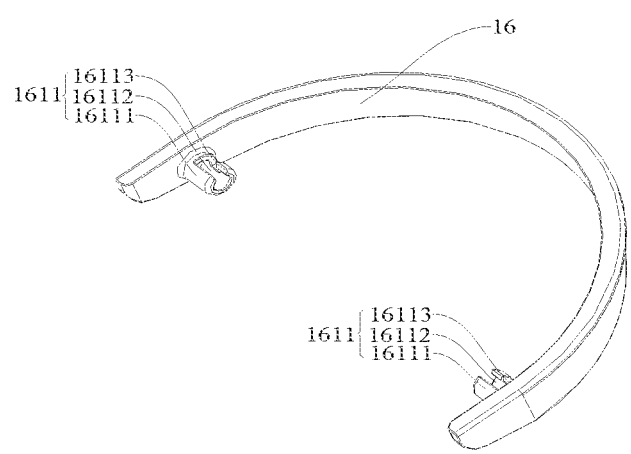
FIG. 20 is a schematic perspective structural diagram of a handle with the first inserting structure according to some embodiments of the present application.
Figure 21:
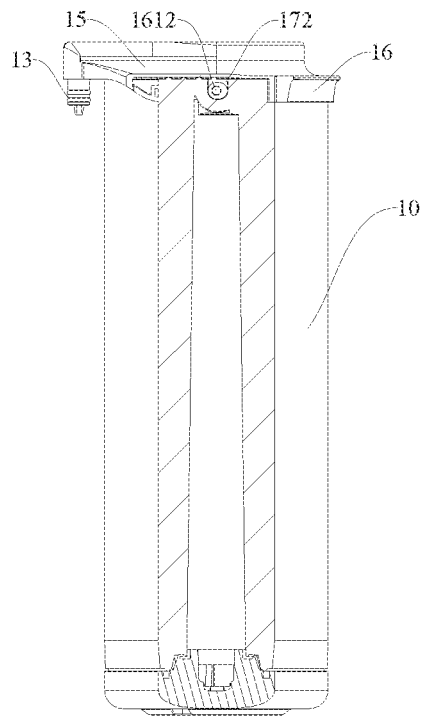
FIG. 21 is a schematic diagram of a fitting relationship between a second fixing structure and a second inserting structure of the combined filter unit assembly according to some embodiments of the present application at the first position.

At the second position, as shown in FIGS. 18 and 19, the limiting post 1712 is engaged into an engaging hole 16113. That is, when rotated from the first position to the second position, the limiting post 1712 is inserted into the engaging hole 16113 from the guide groove 16112, and the engaging hole 16113 prevents the limiting post 1712 from being moved in the axial direction.

For convenience of description, in the following, the fixing structure 17 fitted with a first inserting structure 1611 is referred to as a first fixing structure 171, and the fixing structure 17 fitted with a second inserting structure 1612 is referred to as a second fixing structure 172.

Furthermore, the feature defined with "first", "second" and "third" may include one or more of this feature explicitly or implicitly and is used for distinguishing descriptive features without considering an order and significance.

In one embodiment, the guide groove 16112 extends in the axial direction of the shaft sleeve 16111. At this point, when the guide post 1711 is inserted into the shaft sleeve 16111, the shaft sleeve 16111 is moved in the axial direction to move the engaging hole 16113 to the limiting post 1712, and then, the handle 16 is rotated to engage the limiting post 1712 in the engaging hole 16113.

In some other embodiments, the guide groove 16112 extends helically in the direction from the end portion to the engaging hole 16113; that is, the guide groove 16112 is configured as a helical extension groove. When the guide post 1711 is inserted into the shaft sleeve 16111, the shaft sleeve 16111 is rotated (similar to a screwing operation) while moved in the axial direction, and the engaging hole 16113 is moved to the limiting post 1712, and then, the handle 16 is rotated to engage the limiting post 1712 in the engaging hole 16113.

In one embodiment, the guide groove 16112 and the engaging hole 16113 both run through the shaft sleeve 16111 in the thickness direction of the shaft sleeve 16111. Thus, the guide groove 16112 and the engaging hole 16113 are conveniently machined at the shaft sleeve 16111. Certainly, the present disclosure is not limited thereto, the guide groove 16112 and the engaging hole 16113 may be provided at an inner wall of the shaft sleeve 16111, for example, and the above-mentioned function may also be achieved.

Figure 24:
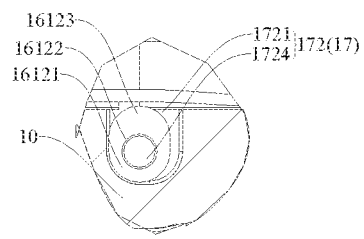
FIG. 24 is a schematic structural diagram in which the second fixing structure is fitted with the second inserting structure at the second position according to some embodiments of the present application.
Figure 25:
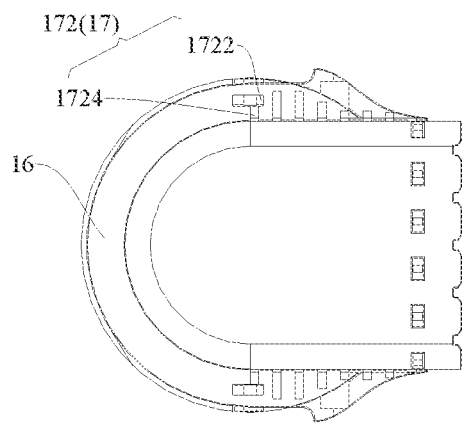
FIG. 25 is a top view of the second fixing structure and the second inserting structure of the combined filter unit assembly according to some embodiments of the present application.
Figure 26:
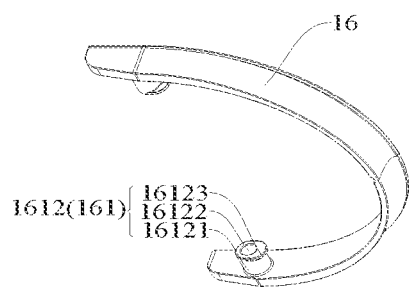
FIG. 26 is a schematic perspective structural diagram of a handle with the second inserting structure according to some embodiments of the present application.

In some other embodiments of the present application, as shown in FIGS. 21 to 26, the fitting structure 161 is configured as the second inserting structure 1612 including an inserting post 16121, an engaging block 16123 is provided at an end portion of the inserting post 16121, and as shown in FIG. 26, and the arrangement of the engaging block 16123 makes an end profile of the inserting post 16121 non-circular.

Correspondingly, the fixing structure 17 defines a groove 1721 therein, and an end portion of the groove 1721 has a constriction 1722 which is formed in a non-circular shape engaged with the end portion of the inserting post 16121. Formation of the constriction 1722 in the non-circular shape engaged with the end portion of the inserting post 16121 means that the shape of the end portion of the inserting post 16121 conforms to the shape of the constriction 1722 when the handle 16 is at the first position, and certainly, the constriction 1722 is slightly larger than the end portion of the inserting post 16121. An inner shape of the groove 1721 is not limited as long as the inserting post 16121 may be rotated to the second position after inserted into the groove 1721, that is, the interior of the groove 1721 may not interfere with the engaging block 16123 at the second position.

At the first position, the inserting post 16121 may be inserted into the groove 1721 through the constriction 1722, and at the second position, the engaging block 16123 is engaged inside the constriction 1722.

Figure 22:
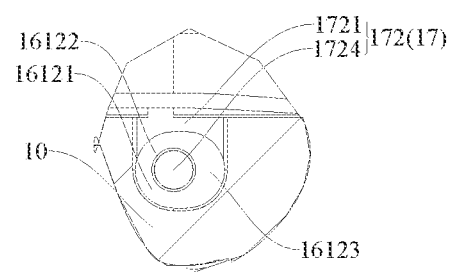
FIG. 22 is a schematic partial structural diagram in which the second fixing structure is fitted with the second inserting structure at the first position according to some embodiments of the present application.
Figure 23:
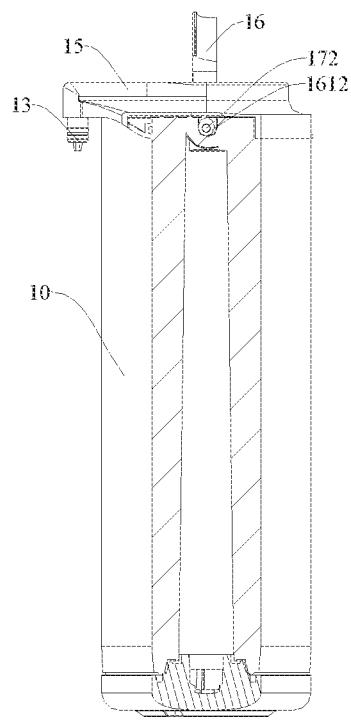
FIG. 23 is a schematic diagram of a fitting relationship between the second fixing structure and the second inserting structure of the combined filter unit assembly according to some embodiments of the present application at the second position.

In one embodiment, as shown in FIGS. 22, 24, and 25, a coaxially provided inserting hole 16122 is provided at the inserting post 16121, and a connecting post 1724 is provided in the groove 1721, and inserted into the inserting hole 16122. The connecting post 1724 is engaged with the inserting hole 16122, and on the one hand, the handle 16 is mounted at the housing 10 to provide a guiding function at the first position, and on the other hand, a rotation axis is provided for rotation of the handle 16 from the first position to the second position. In addition, when the handle 16 is rotated to the second position, the connecting post 1724 may be used as a bearing rod to achieve a supporting function.

In one embodiment, as shown in FIGS. 22, 24 and 26, the outer contour of the end portion of the inserting post 16121 has one semicircular half and the other semielliptical half, and the constriction 1722 of the groove 1721 has one semicircular half and the other semielliptical half. With this arrangement, on the one hand, the inserting post is engaged with the constriction, and the handle 16 is easy to identify and assemble; and on the other hand, the semielliptical end of the inserting post 16121 has a part of the engaging block 16123, and the contour is smooth and not prone to blockage, which is more beneficial to formation of a stable supporting function, and the handle 16 is not prone to disengagement from the exterior of the housing 10.

In the assembly process of the combined filter unit 100, the RO filter membrane 22 is firstly wound at the central tube 21, the third filter assembly 50 is then provided in the filter material installation cavity 210, the internal tube 30 is assembled in the filter material installation cavity 210 with the lower end abutting against the third filter assembly 50, the water outlet tube 60 is inserted in the internal tube 30, the second filter assembly 40 is fitted over the water outlet tube 60, and the central tube 21 is finally covered with the annular inner cover 23; and the water outlet tube 60 and the PAC upper end cover 43 extend out of the middle of the annular inner cover 23. Then, the first filter assembly 20 is inserted into the cylinder 11; a first water channel, a second water channel, a third water channel, a fourth water channel and a fifth water channel are defined at a top wall of an inner cavity of the cylinder 11, the first water channel is communicated with the second water outlet 114 and the water outlet tube 60, one end of the second water channel is communicated with the first water inlet 111, and the other end of the second water channel is communicated with a channel between the outer circumferential wall of the PAC upper end cover 43 and the inner circumferential wall of the annular inner cover 23; one end of the third water channel is communicated with the first water outlet 112, the other end of the third water channel is communicated with a channel between the inner circumferential wall of the PAC upper end cover 43 and the outer circumferential wall of the water outlet tube 60, one end of the fourth water channel is communicated with the second water inlet 113, the other end of the fourth water channel is communicated with a channel between the outer circumferential wall of the RO filter membrane 22 and the inner circumferential wall of the cylinder 11, and the fifth water channel is communicated with the third water outlet 115 and the waste water opening 232.

In some embodiments, central axes of the first and second filter assemblies 20, 40, the internal tube 30 and the water outlet tube 60 coincide with a central axis of the housing 10. That is, the water outlet tube 60, the second filter assembly 40, the internal tube 30, the first filter assembly 20 and the housing 10 are nested in sequence, thus reducing the occupied space of the water outlet tube 60, the second filter assembly 40, the internal tube 30 and the first filter assembly 20, improving the utilization efficiency of the internal space of the combined filter unit 100, then reducing the volume of the housing 10, and providing convenience for the use and assembly of the combined filter unit 100.

To better understand the solution of the embodiments of the present application, the structure of the combined filter unit 100 according to one specific embodiment of the present application is described below with reference to FIGS. 1 to 15.

The following specific embodiment takes tap water purification as an example to explain the three-stage filtering function of the combined filter unit 100, and to explain the highly integrated design structure of the combined filter unit 100 and the handle 16 for conveniently taking and placing the combined filter unit 100. The second filter assembly 40 is described by taking as an example a roll-type primary filter part formed by rolling a non-woven fabric, a polypropylene layer, carbon fibers, and a PAC carriage 41; and the first filter assembly 20 is illustrated with a reverse osmosis filter unit as an intermediate filter. The third filter assembly 50 is illustrated with a cylindrical hollow carbon rod as a final filter.

As shown in FIGS. 1 to 15, a combined filter unit 100 is vertically installed in a normal state. The combined filter unit 100 includes: a housing 10, a first filter assembly 20, an internal tube 30, a second filter assembly 40, a third filter assembly 50, a water outlet tube 60 and a glue blocking ring 442. A filtering cavity is defined in the housing 10, the first filter assembly 20 is provided in the filter cavity, a filter material installation cavity 210 with one open side is defined in the first filter assembly 20, the internal tube 30 is detachably provided in the filter material installation cavity 210, and the second filter assembly 40 is provided in the internal tube 30. An outer wall of the first filter assembly 20 and an inner wall of the housing 10 define a first water purification cavity 51 in communication with a second water inlet 113, an inner wall of the first filter assembly 20 and an outer wall of the internal tube 30 define a pure water cavity 52 in communication with a second water outlet 114, an inner wall of the internal tube 30 and an outer wall of the second filter assembly 40 define a tap water cavity 53 in communication with a first water inlet 111, and a second water purification cavity 54 in communication with a first water outlet 112 is defined in the second filter assembly 40. An upper portion of the housing 10 is further provided with a waste water opening 232 in communication with the first filter assembly 20.

In one embodiment, the internal tube 30 and the third filter assembly 50 are axially provided in the filter material installation cavity 210 front and rear, a pure water cavity 52 is defined inside a central tube 21 in the first filter assembly 20, and the third filter assembly 50 divides the pure water cavity 52 into an external original pure water cavity 522 and an internal water outlet cavity 521. Two ends of the upper portion of the housing 10 close to a decorative cover 15 are each provided with a connection point to be connected with a handle 16. One end of the water outlet tube 60 is communicated with the second water outlet 114, and the other end of the water outlet tube 60 extends out of the internal tube 30 and extends into the PAC carriage 41 of the third filter assembly 40 after running through the internal tube 30 along the axial direction of the internal tube 30, and is communicated with the water outlet cavity 521.

As shown in FIG. 5, the second filter assembly 40 is provided around the water outlet tube 60, a PAC lower end cover 44 and the water outlet tube 60 are integrally molded by injection, and the PAC lower end cover 44 is formed as an annular plate and connected to an end surface of the second filter assembly 40. The glue blocking ring 442 includes a connecting ring and a sealing ring, the sealing ring is formed in a cylindrical shape and fitted over the second filter assembly 40 and the PAC lower end cover 44, and the connecting ring extends radially inwards from an end edge of the sealing ring away from the second filter assembly 40. The PAC lower end cover 44 is provided with engaging protrusions 440, the glue blocking ring 442 is provided with engaging holes engaged with the engaging protrusions 440, and the engaging protrusions 440 and the engaging holes are engaged with each other after the glue blocking ring 442 is fitted over the water outlet tube 60.

The whole process of filtering the tap water means that the tap water enters the tap water cavity 53 from the first water inlet 111, flows to a radial inner side, enters the second water purification cavity 54 under the filtering action of the second filter assembly 40, and flows out through the first water outlet 112. The purified water flowing out enters the first water purification cavity 51 through the second water inlet 113 under the action of a booster pump, water flow in the first water purification cavity 51 enters the original pure water cavity 522 through the filtering action of the first filter assembly 20, and water flow in the original pure water cavity 522 enters the water outlet cavity 521 after filtered by the third filter assembly 50, is then guided upwards through the water outlet tube 60, and flows out from the second water outlet 114 for a user to drink.

In addition, a cooperation structure of the glue blocking ring 442 and the PAC lower end cover 44 in the present application may also be used in other types of locations of a filter unit assembly where glue blockage is required, and is not limited to glue blockage during a gluing process between a glue blocking plate 44 at the water outlet tube 60 of the combined filter unit 100 and the second filter assembly 40 mentioned in the present application.

The water treatment apparatus according to the embodiments of the present application includes the combined filter unit 100 described in the above embodiments, and adoption of the combined filter unit 100 according to the above embodiments may reduce a volume of the water treatment apparatus to save an occupied space, improve stability of the water treatment apparatus, and prevent water flow leakage.

One of some water treatment apparatuses further includes a booster pump and a tank, the tank is provided with a water supply apparatus, a water outlet and a drainage port, the combined filter unit 100 and the booster pump are provided in the tank, the water supply apparatus is communicated with the first water inlet 111 to supply water to the water treatment apparatus, the booster pump is communicated between the first water outlet 112 and the second water inlet 113 and configured to pressurize and then pump the water flowing out of the second water purification cavity 54 into the first water purification cavity 51, the water outlet is communicated with the second water outlet 114 for the user to take water, and the drainage port is communicated with the third water outlet 115 for discharging waste water.

The water treatment apparatus according to embodiments of the present application includes the combined filter unit 100 described in the above embodiments, and the adoption of the combined filter unit 100 according to the above embodiments may reduce the volume of the water treatment apparatus to save the occupied space, improve quality of the outlet water, and provide convenience for use by the user.

Other configurations and operations of the water treatment apparatus according to the embodiments of the present application and will not be described in detail herein.

In the description of the present specification, reference throughout this specification to "some embodiments", "exemplary embodiment", "example", "specific example" or "some examples" means that a particular feature, structure, material, or characteristic described in connection with the embodiment or example is included in at least some embodiments or examples of the present application. In the specification, the schematic expressions to the above-mentioned terms are not necessarily referring to the same embodiment or example. Furthermore, the described particular features, structures, materials, or characteristics may be combined in any suitable manner in one or more embodiments or examples.

What is claimed is:

1. A combined filter unit, comprising:
    a housing;
    a first filter assembly provided in the housing, and a filter material installation cavity being defined in the first filter assembly;
    an internal tube provided in the filter material installation cavity; and
    a second filter assembly provided in the internal tube; wherein the filter material installation cavity includes an inner circumferential wall adjacent an open top thereof,
    the internal tube has an open end, an outer edge of the open end of the internal tube hermetically abuts against the inner circumferential wall of the filter material installation cavity, wherein in use water pressure inside the internal tube is higher than water pressure outside the internal tube increasing a sealing effect between the outer edge and the inner circumferential wall, wherein an inner diameter of an upper portion of the filter material installation cavity is kept constant or gradually reduced in a direction from top to bottom; and
    a length of the filter material installation cavity in an axial direction of the internal tube is greater than a length of the internal tube resulting in a space between a bottom of the internal tube and a bottom of the filter material installation cavity.

2. The combined filter unit according to claim 1, wherein the internal tube is detachably provided in the filter material installation cavity, wherein the first filter assembly is configured as a reverse osmosis ("RO") filter unit, and the second filter assembly is configured as a polyaluminum chloride ("PAC") filter unit having a wall thickness greater than 10 mm.

3. The combined filter unit according to claim 1, wherein the housing is provided with a first water inlet, a first water outlet, a second water inlet and a second water outlet;
    an outer wall of the first filter assembly and an inner wall of the housing define a first water purification cavity in communication with the second water inlet;
    an inner wall of the first filter assembly and an outer wall of the internal tube define a pure water cavity in communication with the second water outlet;
    an inner wall of the internal tube and an outer wall of the second filter assembly define a tap water cavity in communication with the first water inlet; and
    a second water purification cavity in communication with the first water outlet is defined in the second filter assembly.

4. The combined filter unit according to claim 3, wherein the first filter assembly comprises:
    a central tube, the filter material installation cavity being provided in the central tube, a pure water through hole being defined on a wall of the central tube;
    an RO filter membrane fitted over the central tube; and
    an annular inner cover fitted over the central tube, an inner circumferential edge of the annular inner cover being connected with an upper end edge of the internal tube, and a lower end surface of the annular inner cover abutting against an upper end surface of the RO filter membrane.

5. The combined filter unit according to claim 4, wherein a waste water groove opening downwards is defined in the annular inner cover, the upper end surface of the RO filter membrane cooperates with the annular inner cover to seal the waste water groove to form a waste water cavity, and a waste water opening in communication with the waste water cavity is defined at a top of the annular inner cover, wherein a third water outlet in communication with the waste water opening is defined at a top of the housing.

6. The combined filter unit according to claim 3, wherein the second filter assembly comprises:
a PAC framework located in the internal tube and extending along an axial direction of the internal tube, the second water purification cavity being defined in the PAC framework; and
a PAC filter membrane fitted over the PAC framework and extending along an axial direction of the PAC framework, the tap water cavity being defined between an outer circumferential wall of the PAC filter membrane and an inner circumferential wall of the internal tube, wherein the PAC framework is tubular, an inner cavity of the PAC framework is in communication with the first water outlet, and a water purification through hole is defined on a wall of the PAC framework.

7. The combined filter unit according to claim 6, wherein the second filter assembly further comprises:
a PAC upper end cover fitted over an upper portion of the PAC framework, a lower surface of the PAC upper end cover hermetically abutting against an upper end surface of the PAC filter membrane, and a first water through hole configured to communicate the tap water cavity with the first water inlet and a second water through hole configured to communicate the second water purification cavity with the first water outlet being defined on the PAC upper end cover; and
a PAC lower end cover fitted over a lower portion of the PAC framework, an upper surface of the PAC lower end cover hermetically abutting against a lower end surface of the PAC filter membrane, wherein an upper flange folded downwards is formed at an outer circumferential edge of the PAC upper end cover, and an inner wall of the upper flange abuts against the outer circumferential wall of the PAC filter membrane; and
a lower flange folded upwards is formed at an outer circumferential edge of the PAC lower end cover, and an inner wall of the lower flange abuts against the outer circumferential wall of the PAC filter membrane.

8. The combined filter unit according to claim 3, further comprising:
a third filter assembly provided in the pure water cavity and dividing the pure water cavity into an original pure water cavity located outside the third filter assembly and a water outlet cavity located inside the third filter assembly, the water outlet cavity being in communication with the second water outlet, wherein the third filter assembly and the internal tube are arranged along an axial direction of the first filter assembly; and
a water outlet tube running through the internal tube along the axial direction of the internal tube, a first end of the water outlet tube being in communication with the water outlet cavity, and a second end of the water outlet tube being in communication with the second water outlet.

9. The combined filter unit according to claim 8, wherein a supporting platform extending along an axial direction of the third filter assembly is provided in the filter material installation cavity, and abuts between a lower end of the internal tube and a bottom wall of the filter material installation cavity.

10. The combined filter unit according to claim 9, wherein there are a plurality of supporting platforms, and the plurality of supporting platforms are provided at intervals along a circumferential direction of the third filter assembly.

11. The combined filter unit according to claim 3, wherein the housing comprises:
a cylinder, a bottom of the cylinder being open, the first filter assembly being provided in the cylinder, and the first water inlet, the first water outlet, the second water inlet and the second water outlet being defined at the top of the cylinder; and
a lower cover connected with the cylinder to seal an opening of the cylinder, an upper surface of the lower cover being hermetically abutting against a lower end surface of the first filter assembly, wherein central axes of the first filter assembly and the second filter assembly as well as the internal tube coincide with a central axis of the housing.

12. The combined filter unit according to claim 3, further comprising:
a water outlet tube, a first end of the water outlet tube being in communication with the second water outlet, and a second end of the water outlet tube extending out of the internal tube and extending into the filter material installation cavity after running through the internal tube along the axial direction of the internal tube, wherein a PAC lower end cover is provided on an outer circumferential wall of the water outlet tube, and the second filter assembly adheres to the PAC lower end cover; and
a glue blocking ring fitted over the water outlet tube, an outer circumferential edge of the glue blocking ring being provided at a circumferential outer side of the PAC lower end cover for blocking.

13. The combined filter unit according to claim 12, wherein the second filter assembly is provided around the water outlet tube, the PAC lower end cover is formed as an annular plate and connected to an end surface of the second filter assembly, and
the glue blocking ring comprises a connecting ring and a sealing ring, the sealing ring is formed in a cylindrical shape and fitted over outsides of the second filter assembly and the PAC lower end cover, and the connecting ring extends radially inwards from an end edge of the sealing ring away from the second filter assembly.

14. The combined filter unit according to claim 12, wherein an engaging protrusion is provided on the PAC lower end cover, and an engaging hole engaged with the engaging protrusion is defined on the glue blocking ring.

15. The combined filter unit according to claim 12, wherein the water outlet tube is configured as an integral injection molded part, and the PAC lower end cover is integrally molded on the water outlet tube by injection.

16. The combined filter unit according to claim 1, wherein an outer diameter of an upper end edge of the internal tube is equal to an inner diameter of an upper end edge of the filter material installation cavity.

17. The combined filter unit according to claim 1, wherein a sealing ring is provided between an outer circumferential wall of the internal tube and an inner wall of a central tube.

18. The combined filter unit according to claim 17, wherein a sealing-ring installation groove is defined in an upper portion of the outer circumferential wall of the internal tube and extends along a circumferential direction of the internal tube.

19. A water treatment apparatus, comprising:
a combined filter unit, comprising:
a housing;
a first filter assembly provided in the housing, and a filter material installation cavity being defined in the first filter assembly;
an internal tube provided in the filter material installation cavity; and
a second filter assembly provided in the internal tube; wherein
the filter material installation cavity includes an inner circumferential wall adjacent an open top thereof,
the internal tube has an open end, an outer edge of the open end of the internal tube hermetically abuts against the inner circumferential wall of the filter material installation cavity, wherein in use water pressure inside the internal tube is higher than water pressure outside the internal tube increasing a sealing effect between the outer edge and the inner circumferential wall, wherein an inner diameter of an upper portion of the filter material installation cavity is kept constant or gradually reduced in a direction from top to bottom; and
a length of the filter material installation cavity in an axial direction of the internal tube is greater than a length of the internal tube resulting in a space between a bottom of the internal tube and a bottom of the filter material installation cavity.

\* \* \* \* \*